(12) United States Patent
Shu et al.

(10) Patent No.: US 12,511,903 B2
(45) Date of Patent: Dec. 30, 2025

(54) VIDEO INFORMATION PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Junhui Shu, Shenzhen (CN); Hao Ye, Shenzhen (CN); Tiantian Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 459 days.

(21) Appl. No.: 17/973,418

(22) Filed: Oct. 25, 2022

(65) Prior Publication Data

US 2023/0045726 A1     Feb. 9, 2023

Related U.S. Application Data

(63) Continuation of application No. PCT/CN2021/106552, filed on Jul. 15, 2021.

(30) Foreign Application Priority Data

Aug. 21, 2020   (CN) .......................... 202010847943.3

(51) Int. Cl.
*G06V 20/40*   (2022.01)
*G06V 10/25*   (2022.01)
(Continued)

(52) U.S. Cl.
CPC .............. *G06V 20/48* (2022.01); *G06V 10/25* (2022.01); *G06V 10/26* (2022.01); *G06V 10/761* (2022.01); *G06V 20/46* (2022.01)

(58) Field of Classification Search
None
See application file for complete search history.

(56) References Cited

U.S. PATENT DOCUMENTS

2007/0237416 A1   10/2007 Taguchi et al.
2012/0257831 A1   10/2012 Eaton et al.
(Continued)

FOREIGN PATENT DOCUMENTS

| CN | 101566994 A | 10/2009 |
|----|----|----|
| CN | 104053023 A | 9/2014 |

(Continued)

OTHER PUBLICATIONS

Ralph Cameron Harvey, Spatio-temporal video copy detection, Sep. 15, 2011, Simon Fraser University. (Year: 2012).*
(Continued)

*Primary Examiner* — Ian L Lemieux
(74) *Attorney, Agent, or Firm* — Morgan, Lewis & Bockius LLP

(57) ABSTRACT

This application provides a video information processing method performed by an electronic device. The method includes: determining a video image frame set corresponding to each of a first video and a second video, respectively; determining a static stitching region corresponding to image frames in the video image frame set; cropping the image frames in the video image frame set according to the static stitching region, and determining an image feature vector for the video based on a corresponding cropping result using a video information processing model; and determining a similarity between the first video and the second video based on an image feature vector corresponding to the first video and an image feature vector corresponding to the second video.

18 Claims, 16 Drawing Sheets

(51) Int. Cl.
*G06V 10/26* (2022.01)
*G06V 10/74* (2022.01)

(56) References Cited

U.S. PATENT DOCUMENTS

| | | | | |
|---|---|---|---|---|
| 2018/0068091 | A1* | 3/2018 | Gaidar | G06F 21/16 |
| 2020/0242215 | A1* | 7/2020 | Zou | G06Q 20/405 |
| 2021/0003697 | A1* | 1/2021 | Zhai | G06N 3/08 |
| 2021/0065324 | A1* | 3/2021 | Zhao | G06F 21/16 |
| 2021/0110493 | A1* | 4/2021 | Yang | H04L 63/123 |

FOREIGN PATENT DOCUMENTS

| | | | |
|---|---|---|---|
| CN | 104199896 A | * | 12/2014 |
| CN | 104504717 A | | 4/2015 |
| CN | 105975939 A | | 9/2016 |
| CN | 106686460 A | | 5/2017 |
| CN | 104239420 B | | 6/2017 |
| CN | 107801093 A | | 3/2018 |
| CN | 110162664 A | | 8/2019 |
| CN | 110619603 A | | 12/2019 |
| CN | 111931678 A | | 11/2020 |

OTHER PUBLICATIONS

Munawar, M., & Noreen, I. (2021). Duplicate Frame Video Forgery Detection Using Siamese-based RNN. Intelligent Automation & Soft Computing, 29(3). (Year: 2021).*

D'Avino, D., Cozzolino, D., Poggi, G., & Verdoliva, L. (2017). Autoencoder with recurrent neural networks for video forgery detection. arXiv preprint arXiv:1708.08754. (Year: 2017).*

Singh, G., & Singh, K. (2019). Video frame and region duplication forgery detection based on correlation coefficient and coefficient of variation. Multimedia Tools and Applications, 78(9), 11527-11562. (Year: 2019).*

Jiang, Y. G., & Wang, J. (2016). Partial copy detection in videos: A benchmark and an evaluation of popular methods. IEEE Transactions on Big Data, 2(1), 32-42. (Year: 2016).*

Bui, T., Cooper, D., Collomosse, J., Bell, M., Green, A., Sheridan, J., . . . & Brown, A. (2019). Archangel: Tamper-proofing video archives using temporal content hashes on the blockchain. In Proceedings of the IEEE/CVF Conference on Computer Vision and Pattern Recognition Workshops (Year: 2019).*

Ghimire, S., Choi, J. Y., & Lee, B. (2019). Using blockchain for improved video integrity verification. IEEE Transactions on Multimedia, 22(1), 108-121. (Year: 2019).*

Zhang, D. Y., Badilla, J., Tong, H., & Wang, D. (Aug. 2018). An end-to-end scalable copyright detection system for online video sharing platforms. In 2018 IEEE/ACM International Conference on Advances in Social Networks Analysis and Mining (ASONAM) (pp. 626-629). IEEE. (Year: 2018).*

European Search Report/Written Opinion for EP Application No. 21857438.2 published as EP4120122A1 (family member) dated Jul. 29, 2025 (Year: 2025).*

Tencent Technology, ISR, PCT/CN2021/106552, Oct. 25, 2021, 2 pgs.

Tencent Technology, WO, PCT/CN2021/106552, Oct. 25, 2021, 5 pgs.

Tencent Technology, IPRP, PCT/CN2021/106552, Feb. 16, 2023, 6 pgs.

J. Ross Beveridge et al., "Report on the FG 2015 Video Person Recognition Evaluation", 2015 11th IEEE International Conference and Workshops on Automatic Face and Gesture Recognition, May 4, 2015, 8 pgs.

Tencent Technology, Extended European Search Report and Supplementary Search Report, EP21857438.2, Jul. 13, 2023, 9 pgs.

* cited by examiner

VIDEO INFORMATION PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/106552, entitled "VIDEO INFORMATION PROCESSING METHOD AND APPARATUS, ELECTRONIC DEVICE, AND STORAGE MEDIUM" filed on Jul. 15, 2021, which claims priority to Chinese Patent Application No. 202010847943.3, filed with the State Intellectual Property Office of the People's Republic of China on Aug. 21, 2020, and entitled "VIDEO INFORMATION PROCESSING METHOD AND APPARATUS, ELECTRONIC DEVICE, AND STORAGE MEDIUM", all of which are incorporated herein by reference in their entirety.

FIELD OF THE TECHNOLOGY

This application relates to video information processing technologies, and in particular, to a video information processing method and apparatus, an electronic device, and a storage medium.

BACKGROUND OF THE DISCLOSURE

Under conventional technical conditions, the demand for video information has exploded and the conventional information processing technology can no longer meet the requirement for similarity determining of a large amount of video information. Describing a similarity between videos is a very simple task for human beings, but a difficult one for machines, as it requires the machines to be capable of resolving the problem of semantic understandings of images to correctly integrate computer vision and natural language processing technologies.

For this, an artificial intelligence (AI) technology is introduced, where AI is a theory, method, technology, and application system that uses a digital computer or a machine controlled by a digital computer to simulate, extend, and expand human intelligence, perceive the environment, acquire knowledge, and use knowledge to obtain an optimal result. In the field of video recognition processing, videos can be recognized by using a digital computer or a machine controlled by a digital computer. Currently, research in this field has attracted much attention and can be effectively applied in security, household, medicine, teaching, and other fields. However, there is also a problem of relatively low accuracy of video similarity recognition in this process.

SUMMARY

The technical solutions of the embodiments of this application are implemented as follows:

An embodiment of this application provides a video information processing method, performed by an electronic device, and including:
  determining a video image frame set corresponding to each of a first video and a second video, respectively;
  determining a static stitching region corresponding to image frames in the video image frame set;
  cropping the image frames in the video image frame set according to the static stitching region, and determining an image feature vector for the video based on a corresponding cropping result using a video information processing model; and
  determining a similarity between the first video and the second video based on an image feature vector corresponding to the first video and an image feature vector corresponding to the second video.

An embodiment of this application further provides a video information processing apparatus, including:
  an information transmission module, configured to determine a video image frame set corresponding to each of a first video and a second video, respectively; and
  an information processing module, configured to:
  determine a static stitching region corresponding to image frames in the video image frame set;
  crop the image frames in the video image frame set according to the static stitching region, and determine an image feature vector for the video based on a corresponding cropping result using a video information processing model; and
  determine a similarity between the first video and the second video based on an image feature vector corresponding to the first video and an image feature vector corresponding to the second video.

An embodiment of this application further provides an electronic device, including:
  a memory, configured to store executable instructions; and
  a processor, configured to run the executable instructions stored in the memory store to implement the video information processing method described above.

An embodiment of this application further provides a non-transitory computer-readable storage medium, storing executable instructions, the executable instructions, when executed by a processor, implementing the video information processing method described above.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of this application are further described in detail, a description is made on nouns and terms involved in the embodiments of this application, and the nouns and terms involved in the embodiments of this application are applicable to the following explanations.

(1) "In response to" is used for representing a condition or a state on which an operation to be performed depends. When the dependent condition or state is satisfied, one or more operations may be performed in real time or may have a specified delay. Unless otherwise specified, there is no restriction on an order of performing a plurality of operations to be performed.

(2) A video is a general term for various forms of video information available on the Internet. Different naming of a first video and a second video is only for ease of distinguishing.

(3) A client is a carrier for implementing a specific function in a terminal. For example, a mobile client (APP) is a carrier of a specific function in a mobile terminal, and exemplarily, the function is performing online live streaming (video pushing) or online video playing.

(4) A dynamic stitching region (video dynamic region) is a screen region in which a video changes with a timeline during playing, and this part is main content of the video.

(5) A static stitching region (video static region) is a screen region in which a video does not change with a timeline during playing.

(6) An information flow is a form of content organization arranged in an up-and-down direction according to a specific specification style. In terms of presentation sorting, time sorting, popularity sorting, algorithm sorting, or other manners can be used.

(7) An image feature vector, that is, an image 01 vector, is a binarized feature vector generated based on an image.

(8) A dynamic and static stitching video is a screen region in which part of a video does not change with a timeline during playing, that is, image frames of the video include both a dynamic stitching region and a static stitching region.

Figure 1:
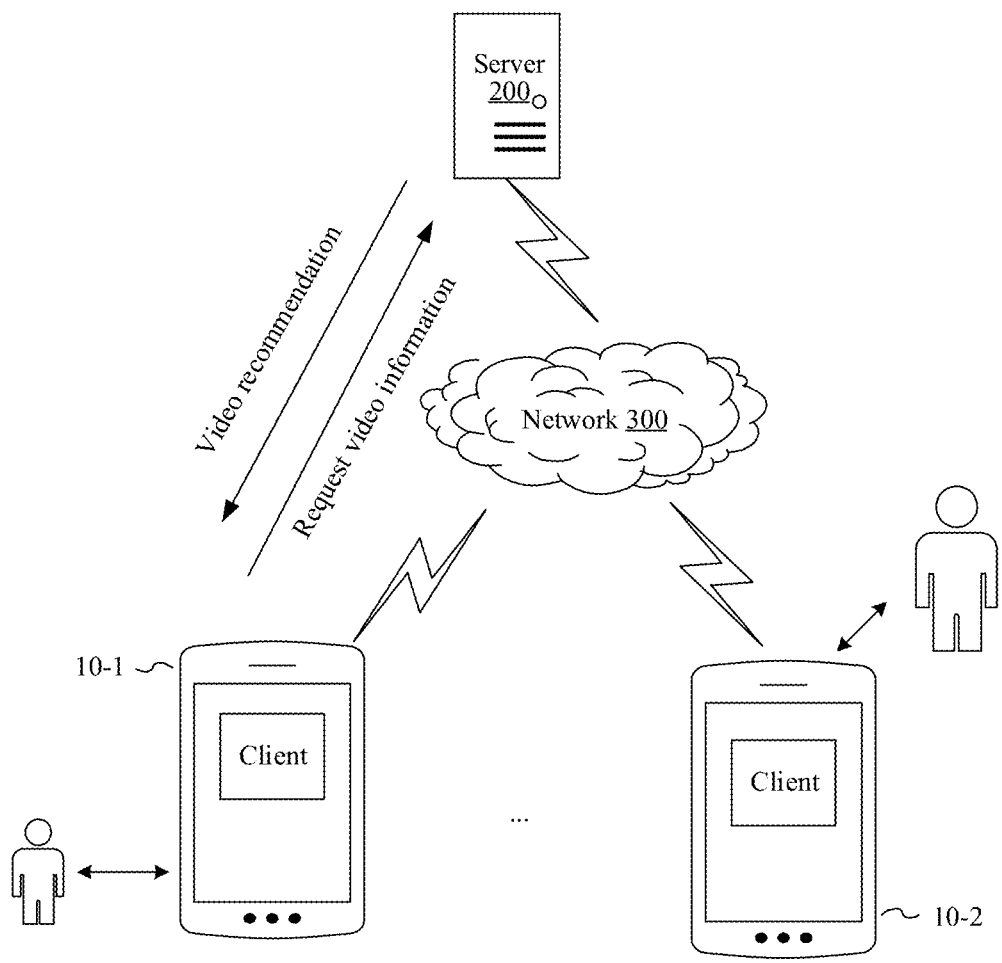
FIG. 1 is a schematic diagram of a usage environment of a video information processing method according to an embodiment of this application.

FIG. 1 is a schematic diagram of a usage scenario of a video information processing method according to an embodiment of this application. Referring to FIG. 1, clients capable of performing different functions are provided on terminals (for example, a terminal 10-1 and a terminal 10-2). The terminals (for example, the terminal 10-1 and the terminal 10-2) may use service processes in the clients to obtain different videos for viewing from a corresponding server 200 through a network 300. The terminals are connected to the server 200 through the network 300. The network 300 may be a wide area network or a local area network, or a combination thereof. Types of the videos obtained by the terminals (for example, the terminal 10-1 and the terminal 10-2) from the corresponding server 200 through the network 300 are not limited. For example, the terminals (for example, the terminal 10-1 and the terminal 10-2) may either obtain a video (that is, the video carries video information or a corresponding video link) from the corresponding server 200 through the network 300, or may obtain a corresponding video including only text or images for viewing from the corresponding server 200 through the network 300. The server 200 may store different types of videos. Compiling environments for different types of videos are not distinguished in this application. In this process, a video pushed to a client of a user needs to be a copyrighted video. Therefore, for a large number of videos, it needs to be determined which videos are similar, and copyright information of the similar videos further needs to be detected for compliance.

Using a short video as an example, this embodiment of this application can be applied to short video playing. During the short video playing, different short videos of different data sources are usually processed, and finally to-be-recommended videos corresponding to a corresponding user are presented in a user interface (UI). If a recommended video is a pirated video that does not comply with copyright regulations, it may have a negative impact on user experience. A backend database for video playing receive a large amount of video data from different sources every day, and different videos obtained for video recommendation to a target user may also be called by another application (for example, a recommendation result of a short video recommendation process is migrated to a long video recommendation process or a news recommendation process). Certainly, a video information processing model matching the corresponding target user may also be migrated to different video recommendation processes (for example, a web video recommendation process, a mini program video recommendation process, or a video recommendation process of a long video client).

In some embodiments, the video information processing method provided in the embodiments of this application may be implemented by a terminal. For example, the terminals (for example, the terminal 10-1 and the terminal 10-2) may locally implement a video information processing solution.

In some embodiments, the video information processing method provided in the embodiments of this application may be implemented by a server. For example, the server 200 may implement a video information processing solution.

In some embodiments, the video information processing method provided in the embodiments of this application may be implemented by terminals and a server in cooperation. For example, the terminals (for example, the terminal 10-1 and the terminal 10-2) may send a request to the server 200 to request the server 200 to implement a video information processing solution. The server 200 may send a finally obtained to-be-recommended video to the terminal for video recommendation.

Figure 2:
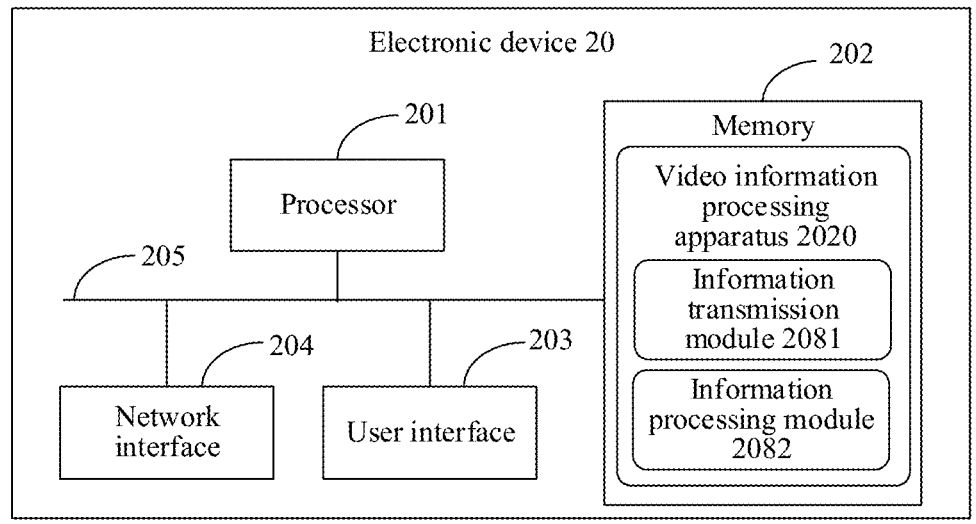
FIG. 2 is a schematic structural composition diagram of an electronic device according to an embodiment of this application.

The following described in detail a structure of an electronic device of the embodiments of this application. The electronic device may be implemented in various forms, for example, a dedicated terminal, such as a gateway, with a video information processing function, or a server with a video information processing function, for example, the server 200 described above in FIG. 1. FIG. 2 is a schematic structural diagram of composition of an electronic device according to an embodiment of this application. It may be understood that, FIG. 2 shows only an exemplary structure rather than a complete structure of the electronic device. The structure shown in FIG. 2 may be partially or entirely implemented based on requirements.

The electronic device provided in this embodiment of this application includes: at least one processor 201, a memory 202, a user interface 203, and at least one network interface 204. All the components in the electronic device 20 are coupled together by using a bus system 205. It may be understood that, the bus system 205 is configured to implement connection and communication between the components. In addition to a data bus, the bus system 205 further includes a power bus, a control bus, and a state signal bus. However, for ease of clear description, all types of buses in FIG. 2 are marked as the bus system 205.

The user interface 203 may include a display, a keyboard, a mouse, a trackball, a click wheel, a key, a button, a touchpad, or a touch screen.

It may be understood that, the memory 202 may be a volatile memory or a non-volatile memory, or may include both a volatile memory and a non-volatile memory. The memory 202 in this embodiment of this application can store data to support operation of the terminal (for example, a terminal 10-1 and a terminal 10-2). Examples of these types of data include any computer program to be operated on the terminal (for example, the terminal 10-1 and the terminal 10-2), for example, an operating system and an application. The operating system includes various system programs, such as framework layers, kernel library layers, and driver layers used for implementing various basic business and processing hardware-based tasks. The application may include various applications.

In some embodiments, a video information processing apparatus provided in the embodiments of this application may be implemented in the form of a combination of software and hardware. In an example, the video information processing apparatus provided in the embodiments of this application may be a processor in the form of a hardware decoding processor, and is programmed to perform the video information processing method provided in the embodiments of this application. For example, the processor in the form of a hardware decoding processor may use one or more application-specific integrated circuits (ASIC), a digital signal processor (DSP), a programmable logic device (PLD), a complex PLD (CPLD), a field programmable gate array (FPGA), or another electronic element.

In an example in which the video information processing apparatus provided in the embodiments of this application is implemented by a combination of software and hardware, the video information processing apparatus provided in the embodiments of this application may be directly embodied as a combination of software modules executed by the processor 201. The software modules may be located in a storage medium, and the storage medium is located in the memory 202. The processor 201 reads executable instructions included in the software modules in the memory 202 and uses necessary hardware (for example, including the processor 201 and other components connected to the bus 205) in combination, to complete the video information processing method provided in the embodiments of this application.

For example, the processor 201 may be an integrated circuit chip, and has a signal processing capability, for example, a general purpose processor, a DSP, or another programmable logical device, a discrete gate or a transistor logical device, or a discrete hardware component. The general purpose processor may be a microprocessor, any conventional processor, or the like.

In an example in which the video information processing apparatus provided in this embodiment of this application is implemented by using hardware, the apparatus provided in this embodiment of this application may be directly executed by a processor 201 in a form of a hardware decoding processor, for example, executed by one or more ASICs, DSPs, PLDs, CPLDs, FPGAs, or other electronic components to implement the video information processing method provided in the embodiments of this application.

The memory 202 in this embodiment of this application is configured to store various types of data to support operation of the electronic device 20. An example of the data includes: any executable instruction configured to be operated on the electronic device 20, such as an executable instruction, and a program that implements the video information processing method of the embodiments of this application may be included in the executable instruction.

In other embodiments, the video information processing apparatus provided in the embodiments of this application may be implemented in the form of software. FIG. 2 shows a video information processing apparatus 2020 that is stored in the memory 202, which may be software in the form of a program, a plug-in, or the like, and include a series of modules. An example of the program stored in the memory 202 may include the video information processing apparatus 2020. The video information processing apparatus 2020 includes the following software modules: an information transmission module 2081 and an information processing module 2082. When the software modules in the video information processing apparatus 2020 are read by the processor 201 into a RAM for execution, the video information processing method provided in the embodiments of this application is implemented.

An embodiment of this application further provides a computer program product or a computer program. The computer program product or the computer program includes computer instructions (executable instructions), the computer instructions being stored in a computer-readable storage medium. A processor of an electronic device reads the computer instructions from the computer-readable storage medium and executes the computer instructions to cause the electronic device to perform the video information processing method provided in the embodiments of this application.

Figure 3:
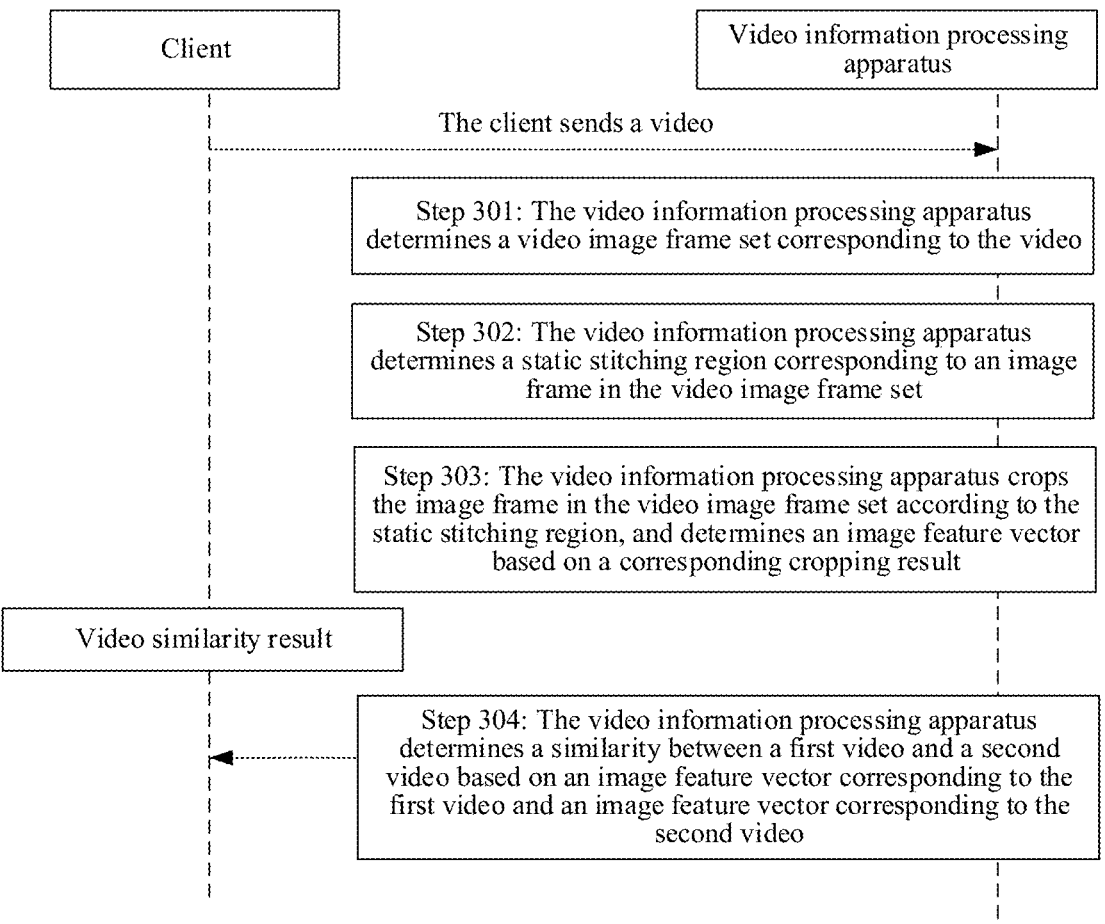
FIG. 3 is a schematic flowchart of a video information processing method according to an embodiment of this application.

The video information processing method provided in the embodiments of this application is described with reference to the electronic device 20 shown in FIG. 2. FIG. 3 is a schematic flowchart of a video information processing method according to an embodiment of this application. It may be understood that, steps shown in FIG. 3 may be performed by various electronic devices running the video information processing apparatus, such as a dedicated terminal, a server, or a server cluster with a video information processing function. The following describes the steps shown in FIG. 3.

Step 301: The video information processing apparatus determines a video image frame set corresponding to a video.

Herein, a video is obtained and a video image frame set corresponding to the video is determined. The video image frame set may include some image frames in the video, or may include all image frames in the video. The image frames in the video image frame set include a dynamic stitching region and a static stitching region.

Figure 4:
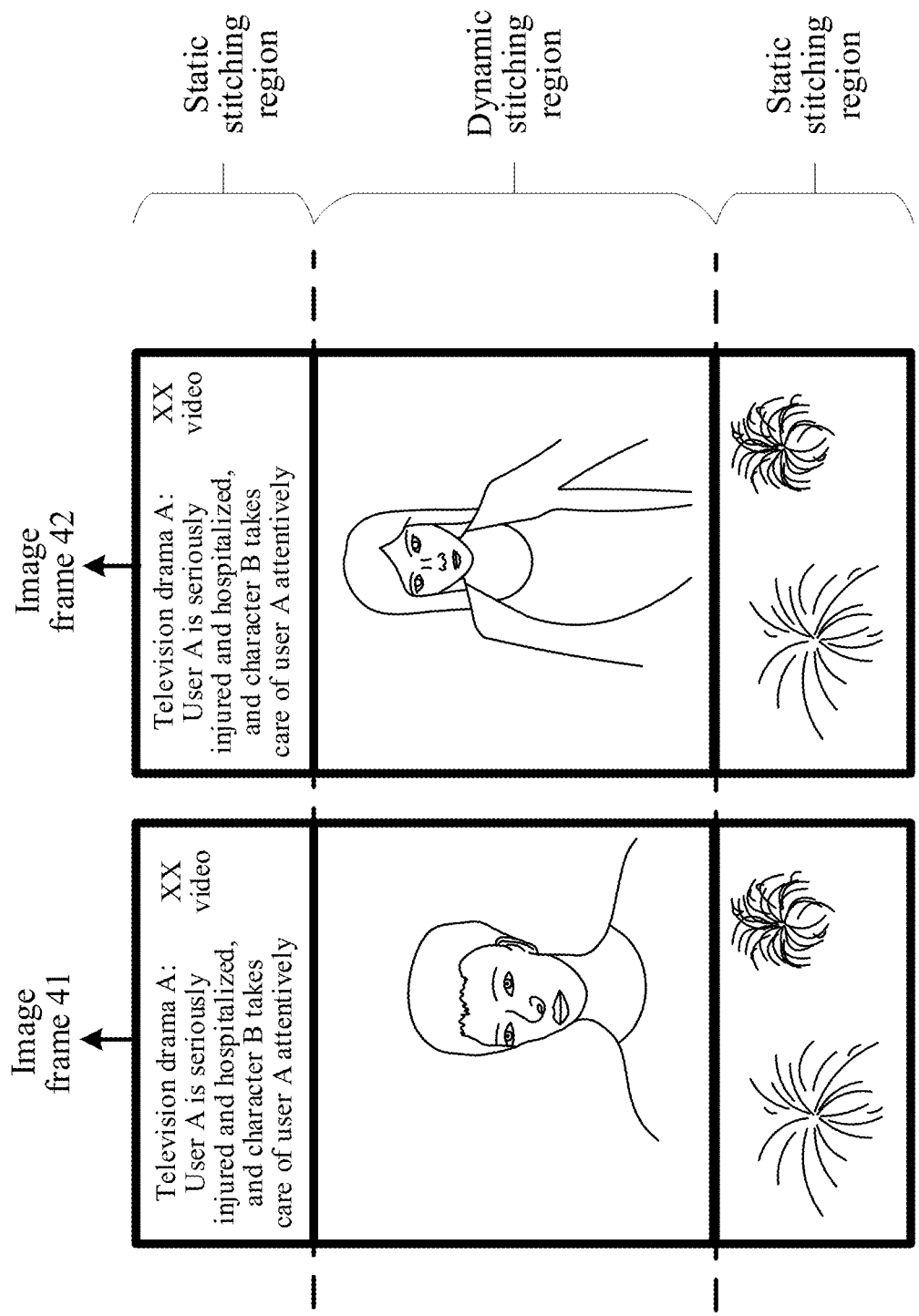
FIG. 4 is a schematic diagram of a dynamic stitching region and a static stitching region of a video image frame according to an embodiment of this application.
Figure 5:
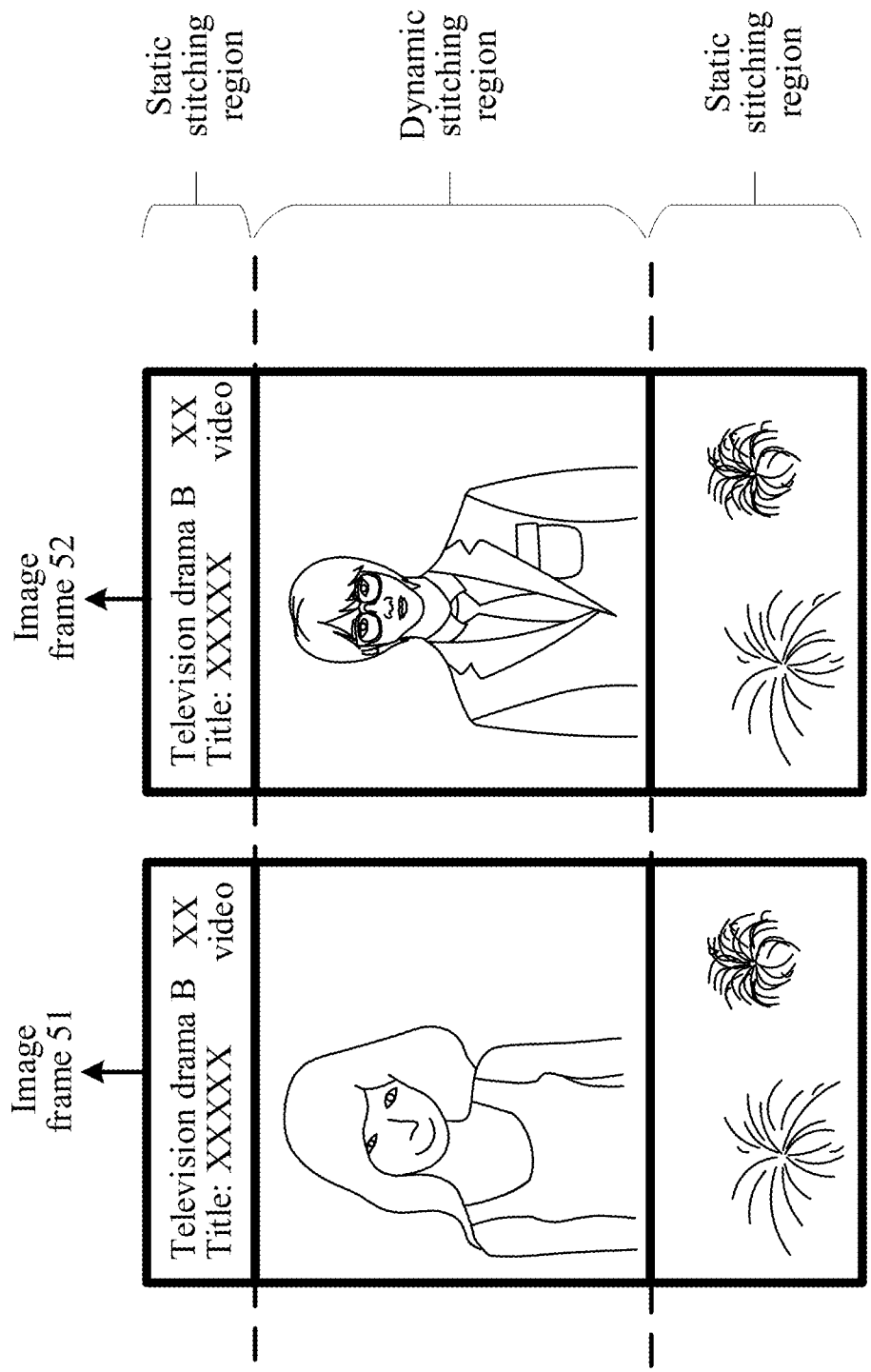
FIG. 5 is a schematic diagram of a dynamic stitching region and a static stitching region of a video image frame according to an embodiment of this application.

For example, referring to FIG. 4 and FIG. 5, FIG. 4 shows different image frames, that is, an image frame 41 and an image frame 42, in one video; and FIG. 5 shows different image frames, that is, an image frame 51 and an image frame 52, in another video. During video playing, a screen region that changes with a timeline is a dynamic stitching region, and this part is main content of a video and can be used for determining whether videos are similar. A screen region that does not change with a timeline during video playing is a static stitching region. When an area of the static stitching region is extremely large or blocked, whether videos are similar is often inaccurately determined. In FIG. 4 and FIG. 5, top and bottom box regions are static stitching regions, and a middle box region is a dynamic stitching region. Through examples of FIG. 4 and FIG. 5, it can be found that an area of the static stitching regions accounts for over 30% of an entire image frame area. It can be learned that the useless static stitching regions in the videos inevitably interfere with video similarity comparison greatly. In the embodiments of this application, the static stitching region can be identified and cropped to sift out the real main content (dynamic stitching region) of the video, thereby making the similarity identification more accurate. This is to be elaborated later.

In some embodiments of this application, the determining a video image frame set corresponding to a video may be implemented in the following manner:

parsing the video to obtain timing information of the video; parsing video parameters corresponding to the video according to the timing information of the video to obtain a play duration parameter and a screen region parameter that correspond to the video; and extracting the video based on the play duration parameter and the screen region parameter that correspond to the video to obtain the video image frame set corresponding to the video.

Step 302: The video information processing apparatus determines a static stitching region corresponding to an image frame in the video image frame set.

For example, for each image frame in the video image frame set, a static stitching region corresponding to the image frame is determined.

In some embodiments of this application, the determining a static stitching region corresponding to an image frame in the video image frame set may be implemented in the following manner:

performing grayscale processing on the image frame in the video image frame set; performing horizontal equal interval sampling and longitudinal equal interval sampling on the image frame on which the grayscale processing has been performed; determining a time dimension variance sum of a horizontal equal interval sampling result of the image frame and a time dimension variance sum of a longitudinal equal interval sampling result of the image frame; determining a longitudinal dimension parameter of the static stitching region of the image frame based on the time dimension variance sum of the horizontal equal interval sampling result of the image frame; and determining a horizontal dimension parameter of the static stitching region of the image frame based on the time dimension variance sum of the longitudinal equal interval sampling result of the image frame.

Figure 6:
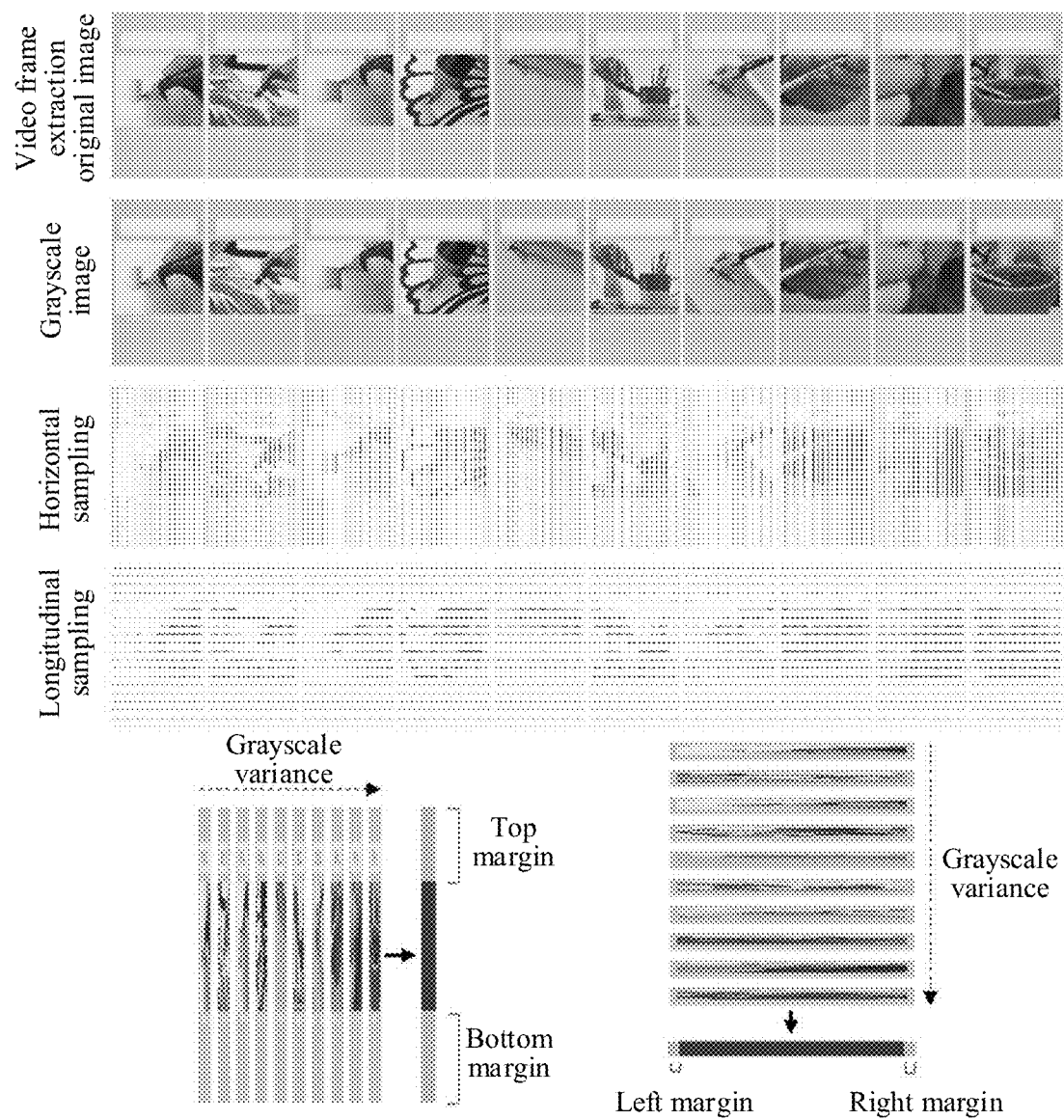
FIG. 6 is a schematic diagram of a process of determining a static stitching region according to an embodiment of this application.

For example, referring to FIG. 6, FIG. 6 is a schematic diagram of a process of determining a static stitching region according to an embodiment of this application. A dynamic and static stitching region (including a dynamic stitching region and a static stitching region) in a video image frame set can be implemented by using a dynamic and static stitching identification and positioning module (encapsulated with a motion recognition algorithm). The dynamic and static stitching identification and positioning module can identify an image frame based on the motion recognition algorithm. The input of the module is image frames extracted from a video in chronological order, and the output thereof is longitudinal dimension parameters (which, for example, include a top region width and a bottom region width) and horizontal dimension parameters (which, for example, include a left region width and a right region width) of a static stitching region of the image frame. A process of processing the image frame by the motion recognition algorithm is shown in FIG. 6. It is assumed that the number of image frames in the video image frame set is n, and dimension parameters of all the image frames are the same (a width is w pixels in a horizontal dimension, and a height is h pixels in a longitudinal dimension). In this case, an exemplary process is as follows: (1) Grayscale processing: The image frames are converted into grayscale images, and for ease of representation, the grayscale images corresponding to all the image frames in the video image frame set are denoted as $M_{n \times w \times h}$. (2) Sampling: For all the grayscale images, k columns of pixels are sampled at equal intervals horizontally, and a sampling result is denoted as $W_{n \times k \times h}$; and k rows of pixels are also sampled at equal intervals longitudinally, and a sampling result is denoted as $H_{n \times w \times k}$. (3) Calculation of time dimension variance sum: A variance of $W_{n \times k \times h}$ in dimension 0 (that is, n dimensions) is calculated, then a sum along dimension 1 (that is, k dimensions) is calculated, and a result vector is denoted as $var_h$, and similarly, a variance of $H_{n \times w \times k}$ in dimension 0 is calculated, then a sum along dimension 2 is calculated, and a result vector is denoted as $var_w$. (4) Margin detection: For $var_h$, traversal is separately performed from the beginning to the end and from the end to the beginning to find the first locations top and bottom at which time dimension variance sums are greater than a threshold T, respectively denoted as top and bottom margins of the static stitching region of the video, the top margin being a top region width, and the bottom margin being a bottom region width; and similarly, for var$_w$, traversal is separately performed from the beginning to the end and from the end to the beginning to find the first locations left and right at which at which time dimension variance sums are greater than the threshold T, respectively denoted as left and right margins of the static stitching region of the video, the left margin being a left region width, and the right margin being a right region width.

Step 303: The video information processing apparatus crops the image frame in the video image frame set according to the static stitching region, and determines an image feature vector based on a corresponding cropping result.

For example, for each image frame in the video image frame set, the image frame is cropped according to the static stitching region of the image frame that is identified in step 302. Cropping refers to cropping out the static stitching region in the image frame, so that the static stitching region can be accurately separated from the dynamic stitching region, that is, only the dynamic stitching region is retained in the cropping result (that is, the cropped image frame).

In some embodiments of this application, the cropping the image frame in the video image frame set according to the static stitching region may be implemented in the following manner:

determining a dimension parameter of a dynamic stitching region corresponding to the image frame according to a dimension parameter of the image frame in the video image frame set and a dimension parameter of the static stitching region corresponding to the image frame; the dimension parameter including a longitudinal dimension parameter and a horizontal dimension parameter; and cropping the image frame to obtain the dynamic stitching region according to the dimension parameter of the dynamic stitching region as an image frame obtained through cropping.

Figure 7A:
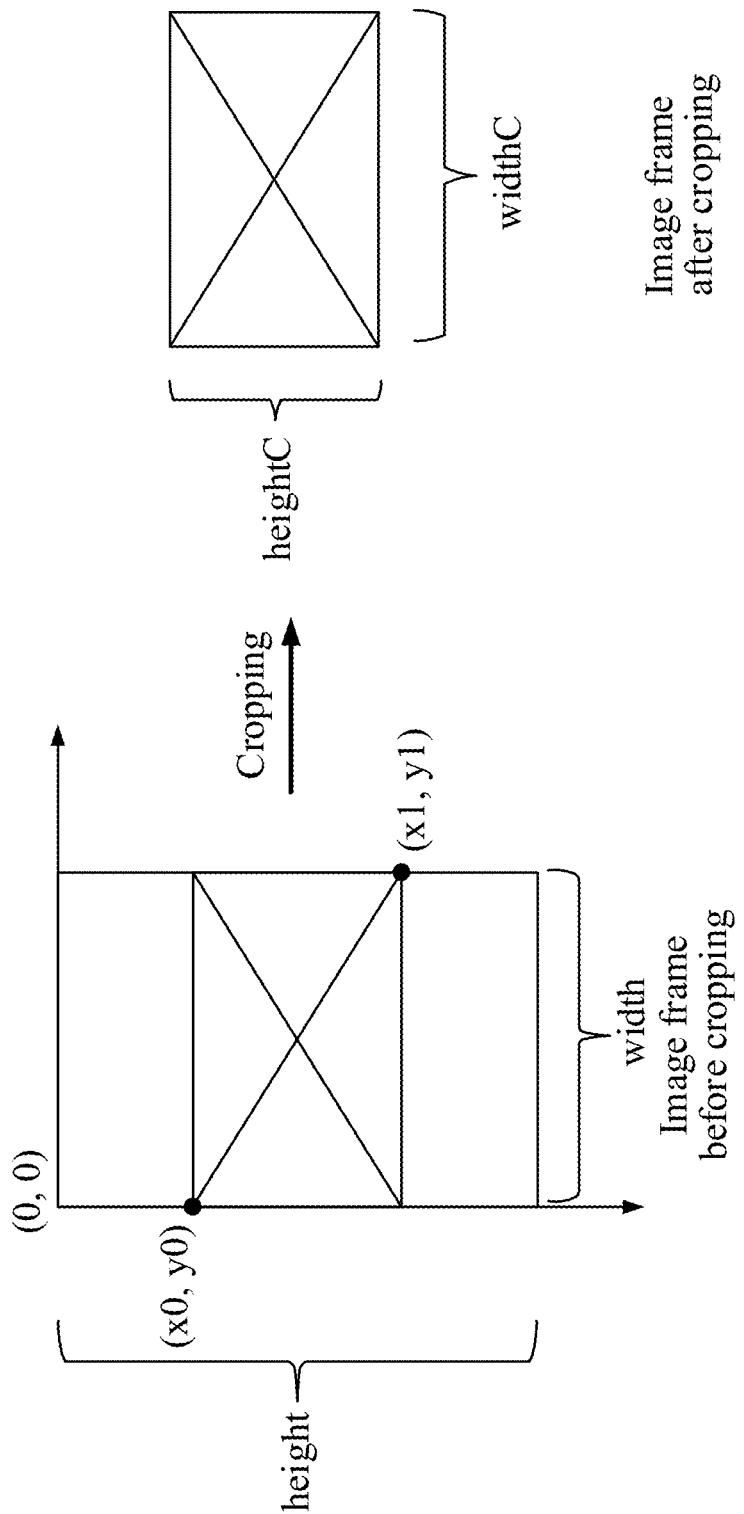
FIG. 7A is a schematic diagram of image frame cropping according to an embodiment of this application.

For example, referring to FIG. 7A, FIG. 7A is a schematic diagram of image frame cropping according to an embodiment of this application. The cropping may be implemented by a cropping module running a cropping algorithm. An exemplary process is as follows: The cropping module crops an image frame according to an identified static stitching region. The input of the cropping module is the image frame and dimension parameters (including a left margin left, a top margin top, a right margin right, and a bottom margin bottom) of the identified static stitching region. The output of the cropping module is the cropped image frame (with a height of heightC and a width of widthC). The cropped image frame includes only the dynamic stitching region.

A width of the image frame before the cropping may be defined as width, and a height thereof is defined as height. An upper left corner of the image frame before the cropping is set as a vertex (0, 0) of a coordinate axis, coordinates of an upper left corner of the dynamic stitching region in the image frame before the cropping are ($x_0$, $y_0$), and coordinates of a lower right corner of the dynamic stitching region are ($x_1$, $y_1$). In this case, according to coordinates of the static stitching region in the image frame before the cropping (where the corresponding coordinates can be obtained according to the dimension parameters of the static stitching region), it can be obtained through calculation that coordinates of the dynamic stitching region are as follows: $x_0$=left, $y_0$=top, $x_1$=width-right, and $y_1$=height-bottom.

In some embodiments of this application, the determining an image feature vector based on a corresponding cropping result includes: constructing a new video image frame set according to a plurality of image frames obtained through cropping, an image frame in the new video image frame set including a dynamic stitching region distinct from the static stitching region; and determining an image feature vector corresponding to the image frame in the new video image frame set.

For example, the cropped image frame includes only the dynamic stitching region that is distinguished from the static stitching region, and a new video image frame set may be constructed according to all the image frames obtained through cropping. Image frames in the new video image frame set may be in a same order as the image frames in the original video image frame set.

For each image frame in the new video image frame set, an image feature vector corresponding to the image frame can be determined.

In some embodiments of this application, the determining an image feature vector corresponding to the image frame in the new video image frame set may be implemented in the following manner:

alternately processing different image frames in the new video image frame set by using a convolutional layer and a maximum value pooling layer of a video information processing model to obtain downsampling results of the different image frames; normalizing the downsampling results by using a fully connected layer of the video information processing model to obtain a normalization result; and performing deep decomposition on the normalization result by using the video information processing model to obtain image feature vectors matching the different image frames.

Figure 7B:
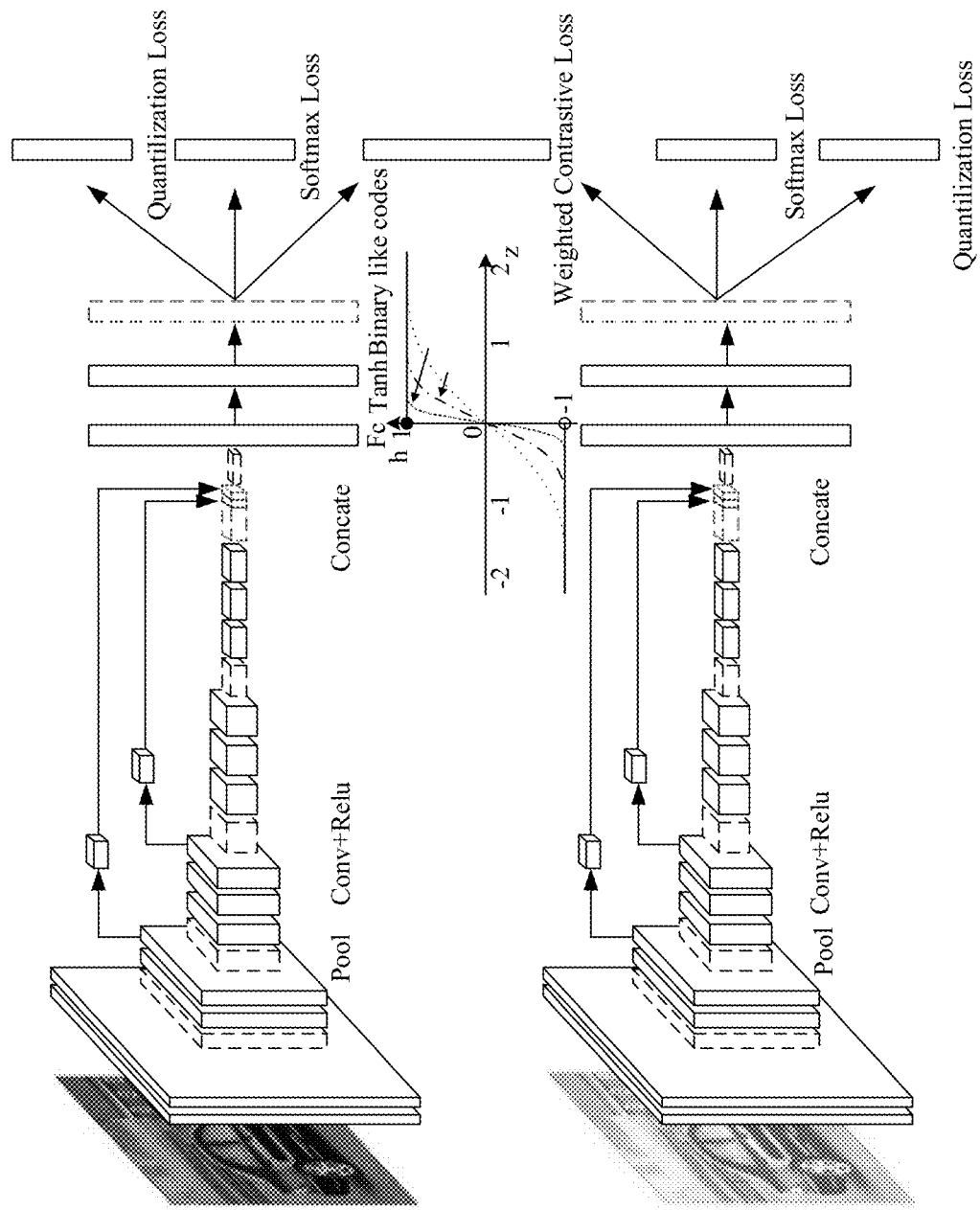
FIG. 7B is a schematic diagram of a processing process of a video information processing model according to an embodiment of this application.

For example, referring to FIG. 7B, FIG. 7B is a schematic diagram of a processing process of a video information processing model according to an embodiment of this application. The image frames in the new video image frame set can be 01 vectorized by using a vectorized model. An exemplary process is as follows: The image frames in the new video image frame set are input into the video information processing model, to convert the image frames into image feature vectors represented by 01 vectors. The input of a vectorization module is the image frames in the new video image frame set, and the output thereof is a 1024-dimensional 01 feature vector ($x_0$, $x_1$ . . . $x_{1023}$) $xi \in \{0,1\}$. The 1024-dimensional feature vector is the corresponding image feature vectors (matching image feature vectors) of the image frames.

Figure 8:
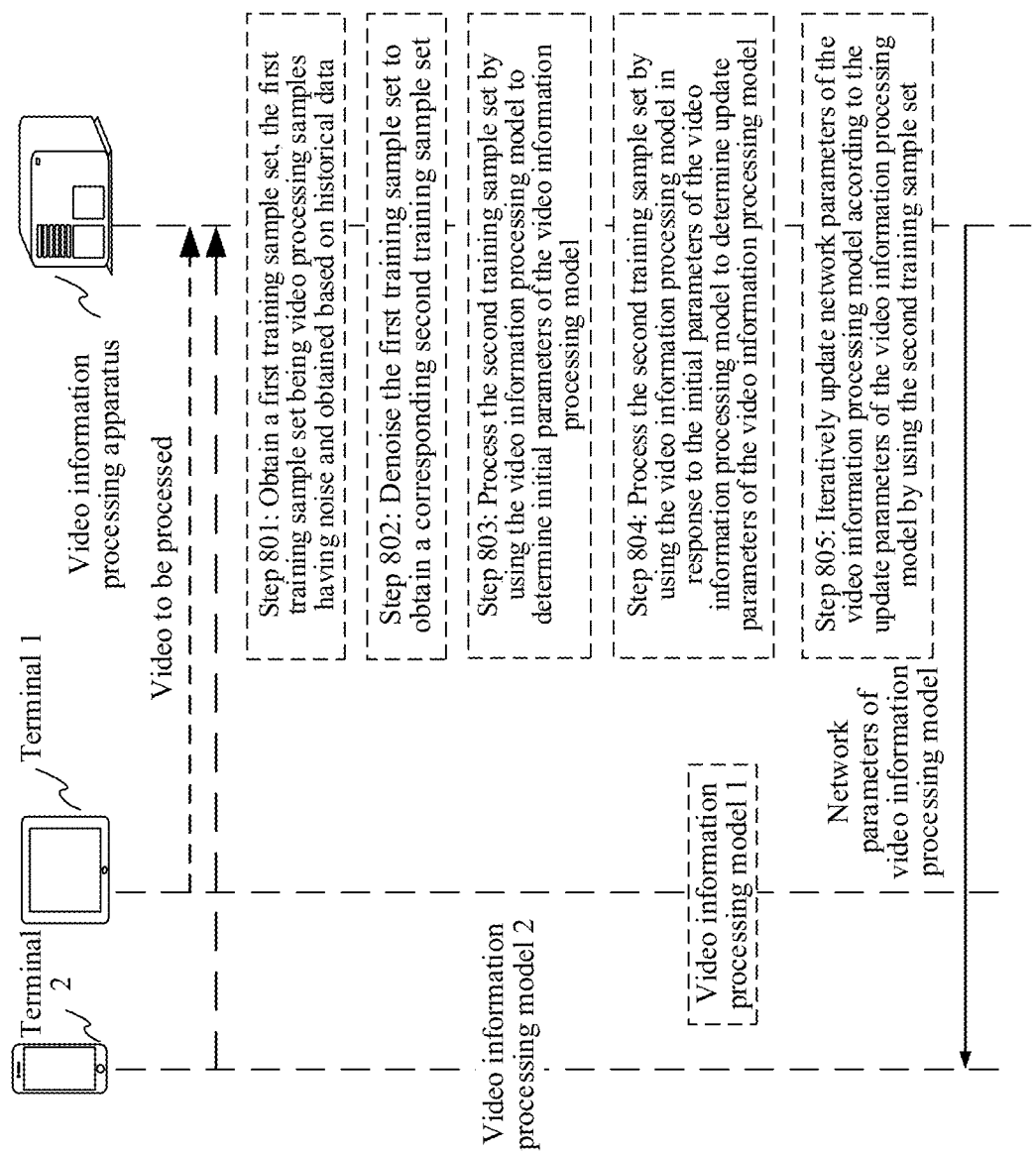
FIG. 8 is a schematic flowchart of training a video information processing model according to an embodiment of this application.

Before this, the video information processing model may be trained. In an example, referring to FIG. 8, FIG. 8 is a schematic flowchart of training a video information processing model according to an embodiment of this application. It may be understood that steps shown in FIG. 8 may be performed by various electronic devices running the video information processing apparatus. For example, the electronic device may be a dedicated terminal with a video information processing function, a server, or a server cluster. The trained video information processing model may be deployed in the server, for detecting a similarity between videos uploaded by a terminal (client), to determine whether copyright information of the videos needs to be detected for compliance. Certainly, the trained video information processing model may also be deployed in the terminal. Description is to be provided with reference to the steps shown in FIG. 8.

Step 801: Obtain a first training sample set, the first training sample set being video processing samples having noise and obtained based on historical data.

Step 802: Denoise the first training sample set to obtain a corresponding second training sample set.

In some embodiments of this application, negative example processing may further be performed on the second training sample set to obtain a negative sample set corresponding to the second training sample set, the negative sample set being used for adjusting network parameters of the video information processing model; and a corresponding marginal loss function value is determined according to the negative sample set, the marginal loss function value being used as a supervision parameter for evaluating a processing result of the video information processing model. The video information processing model in this embodiment of this application can be constructed based on a Siamese framework, thereby preventing the number of linear transformation matrix parameters existing in a classification network from increasing linearly with the number of categories, and avoiding insufficient discriminative capabilities of learned features for open set problems.

In a training phase of the video information processing model, a used positive sample pair may include at least one of a real duplicate image, a duplicate video frame extraction map, and image pairs obtained through different data enhancement processing of images in the video information processing process. Images of the same category and random matching may be used as negative sample pairs, and a margin-based loss function is used for training. The margin-based loss function has the flexibility of triplet loss while maintaining threshold determining. Further, To meet service requirement of mass storage and fast matching, the Hash Net idea can be used for reference, and an activation method of gradually approaching a symbolic function with a training process is adopted for the network. This not only avoids a dilemma that neurons are in a saturation region at an early stage of training and cannot back-propagate learning, but also avoids a problem of large errors caused by direct binarization and quantization of image feature vectors. With 32 times lower storage overheads and 300 times faster distance calculation, the accuracy drops by only 1.8%. Certainly, in some embodiments of this application, a training method of multi-task learning may alternatively be used for multi-domain learning, and GAN loss and other optimizations are introduced to further improve model accuracy and a recall rate.

The performing negative example processing on the second training sample set may be implemented in at least one of the following manners:
randomly combining image feature vectors in the video information processing model to obtain the negative sample set corresponding to the second training sample set; randomly deleting an image feature vector in the video information processing model to obtain the negative sample set corresponding to the second training sample set; or replacing an image feature vector in the video information processing model to obtain the negative sample set corresponding to the second training sample set.

Step 803: Process the second training sample set by using the video information processing model to determine initial parameters of the video information processing model.

Step 804: Process the second training sample set by using the video information processing model in response to the initial parameters of the video information processing model to determine update parameters of the video information processing model.

Step 805: Iteratively update network parameters of the video information processing model according to the update parameters of the video information processing model by using the second training sample set; the updated video information processing model being used for determining an image feature vector.

For example, the trained video information processing model may be deployed in an electronic device (which may be, for example, a video server or a cloud server for determining a similarity between videos), so as to continue to perform the subsequent step 304 to implement determining of the similarity between videos.

Step 304: The video information processing apparatus determines a similarity between a first video and a second video based on an image feature vector corresponding to the first video and an image feature vector corresponding to the second video.

Herein, for any two videos (named a first video and a second video, respectively), a similarity between the first video and the second video may be determined based on an image feature vector corresponding to the first video and an image feature vector corresponding to the second video. An image feature vector corresponding to a video is an image feature vector corresponding to an image frame in the video.

The image feature vector corresponding to the video may be calculated in advance and stored in a corresponding video server. For example, this can be performed for a video whose copyright information has been verified. Certainly, the image feature vector corresponding to the video may alternatively be calculated in real time. For example, this can be performed for a received video uploaded by a user.

In some embodiments of this application, the determining a similarity between a first video and a second video based on an image feature vector corresponding to the first video and an image feature vector corresponding to the second video may be implemented in the following manner:
determining a corresponding inter-frame similarity parameter set according to a similarity between each image frame in a video image frame set corresponding to the first video and each image frame in a video image frame set corresponding to the second video in terms of the image feature vectors; determining, according to the inter-frame similarity parameter set, the number of image frames reaching a similarity threshold; and determining the similarity between the first video and the second video based on the number of image frames reaching the similarity threshold.

Herein, the similarity between the each image frame in the video image frame set corresponding to the first video and the each image frame in the video image frame set corresponding to the second video in terms of the image feature vectors may be determined. Then, the inter-frame similarity parameter set is constructed according to all the obtained similarities.

For example, the similarity between the first video and the second video may be determined by using a similarity calculation module. The input of the similarity calculation module is image feature vectors that need to be compared, and the output thereof is a similarity simscore between the two videos. For example, a pair of image feature vectors that need to be compared are respectively $X=(x_0, x_1 \ldots x_{1023})$ $yi \in \{0,1\}$ and $Y=(y_0, y_1 \ldots y_{1023})$ $yi \in \{0,1\}$. In this case, a Hamming distance $sim_{x,y}$ between the two image feature vectors can be determined, that is, $sim_{x,y}=Hamming(X, Y)$. A smaller Hamming distance indicates a higher similarity.

The number of image frames in the video image frame set corresponding to the first video is set to m, and the number of image frames in the video image frame set corresponding to the second video is set to n. In this case, an inter-frame similarity parameter set can be obtained by calculating similarities between the image frames. For ease of understanding, a parameter set {$sim_{00}sim_{01}$, $sim_{02}$, ..., $sim_{1n-1}$} of the Hamming distance is used as an example herein, $sim_{00}$ representing a Hamming distance between the first image frame in the video image frame set corresponding to the first video and the first image frame in the video image frame set corresponding to the second video, and so on.

The number of image frames (the number of image frames herein may be the number of image frame pairs) whose similarities reach the similarity threshold is determined according to the inter-frame similarity parameter set. The similarity between the first video and the second video can be determined based on the number of image frames reaching the similarity threshold. A larger number of image frames reaching the similarity threshold indicates a higher similarity between the first video and the second video.

In some embodiments of this application, the determining the similarity between the first video and the second video based on the number of image frames reaching the similarity threshold may be implemented in the following manner:

determining the similarity between the first video and the second video based on the number of image frames reaching the similarity threshold, the number of image frames in the video image frame set corresponding to the first video, and the number of image frames in the video image frame set corresponding to the second video.

For example, the number of image frames in the video image frame set corresponding to the first video and the number of image frames in the video image frame set corresponding to the second video may be multiplied to obtain a product result. Then, the number of image frames reaching the similarity threshold is divided by the product result to obtain the similarity between the first video and the second video.

The foregoing parameter set {$sim_{00}sim_{01}$, $sim_{02}$, ..., $sim_{1n-1}$} represented by the Hamming distance is used as an example. The parameter set may be traversed, and it is determined whether a traversed Hamming distance is less than a specified threshold (the Hamming distance being less than the specified threshold indicates the similarity, and the specified threshold is determined according to an actual service scenario), to obtain the final number C of similar images (that is, the number of image frames reaching the similarity threshold). The final similarity simscore between the first video and the second video can be obtained through calculation by using the following formula:

$$simscore = \frac{c}{m*n}.$$

Figure 9:
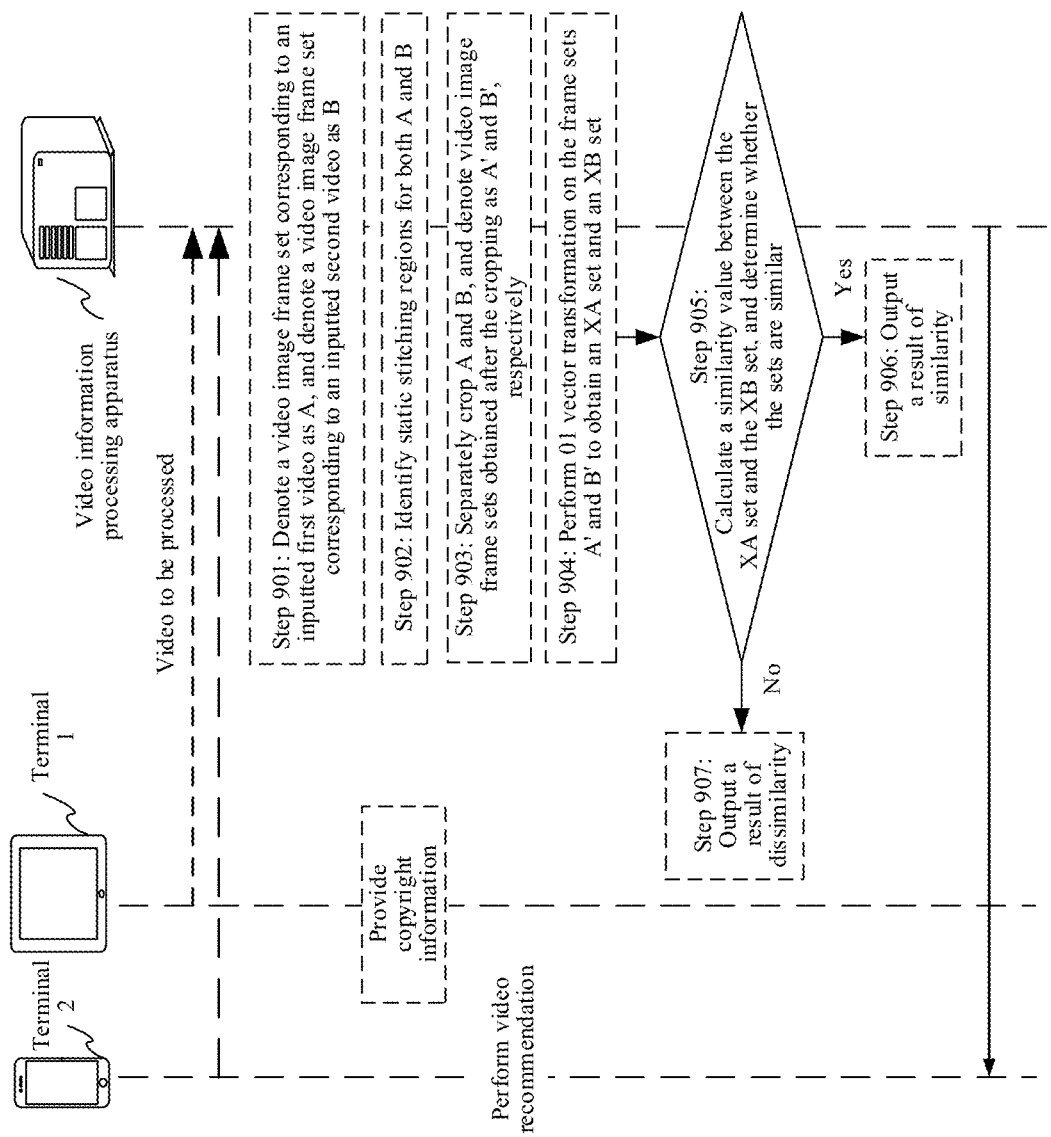
FIG. 9 is a schematic diagram of a process of video similarity determining according to an embodiment of this application.

Continue to refer to FIG. 9. FIG. 9 is a schematic diagram of a process of video similarity determining according to an embodiment of this application. The process specifically includes:

Step 901: Denote a video image frame set corresponding to an inputted first video as A, and denote a video image frame set corresponding to an inputted second video as B.

Step 902: Identify static stitching regions for both A and B.

Step 903: Crop A according to a static stitching region corresponding to A, and denote a video image frame set obtained after the cropping as A'; and crop B according to a static stitching region corresponding to B, and denote a video image frame set obtained after the cropping as B'.

Step 904: Perform 01 vector transformation on all image frames in A' to obtain an XA set (that is, a set including image feature vectors respectively corresponding to all the image frames in A', and the same is true below); and perform 01 vector transformation on all image frames in B' to obtain an XB set.

Step 905: Calculate simscore according to the XA set and the XB set, determine, according to simscore, whether the first video is similar to the second video, and if yes, perform step 906; otherwise, perform step 907.

Step 906: Output a result that the first video is similar to the second video.

Step 907: Output a result that the first video is not similar to the second video.

In some embodiments of this application, copyright information of the first video and copyright information of the second video are obtained when it is determined that the first video is similar to the second video. Legality of the first video is determined based on the copyright information of the first video and the copyright information of the second video. Warning information is issued when the copyright information of the first video is inconsistent with the copyright information of the second video.

Herein, when it is determined that the first video is similar to the second video, it indicates that there may be a possible risk of copyright infringement. Therefore, the copyright information of the first video and the copyright information of the second video may be obtained, and the legality of the first video is determined based on the copyright information of the first video and the copyright information of the second video. In an example, the second video is legal by default. In this case, when the copyright information of the first video is consistent with the copyright information of the second video, it is determined that the first video is legal. When the copyright information of the first video is inconsistent with the copyright information of the second video, it is determined that the first video is illegal. In addition, the warning information may be issued when the copyright information of the first video is inconsistent with the copyright information of the second video.

Certainly, in this embodiment of this application, legality of the second video may be determined when the first video is legal by default.

In some embodiments of this application, the first video is added to a video source when it is determined that the first video is not similar to the second video. Recall ranks of all to-be-recommended videos in the video source are sorted. A video is recommended to a target user based on a sorting result of the recall ranks of the to-be-recommended videos.

Herein, the first video may be added to a video source as a to-be-recommended video in the video source when it is determined that the first video is not similar to the second video. Certainly, herein, the second video may alternatively be added to the video source. When video recommendation is required, the recall ranks of all the to-be-recommended videos in the video source may be sorted, and the video is recommended to the target user based on the sorting result of the recall ranks of the to-be-recommended videos.

In this embodiment of this application, considering the large number of videos, identifiers, copyright information, and image feature vectors of the videos may be stored in a blockchain network or a cloud server, to facilitate determining of similarities and legality of the videos.

In some embodiments of this application, an identifier of the video, an image feature vector corresponding to the video, and copyright information of the video may be transmitted a blockchain network, so that a node of the blockchain network adds the identifier of the video, the image feature vector corresponding to the video, and the copyright information of the video to a new block, and adds the new block to the end of a blockchain when consensus is reached on the new block.

In some embodiments of this application, the method further includes:
receiving a data synchronization request of another node in the blockchain network; performing verification on permission of the another node in response to the data synchronization request; and controlling data synchronization to be performed between a current node and the another node when the permission of the another node is successfully verified, so that the another node obtains the identifier of the video, the image feature vector corresponding to the video, and the copyright information of the video.

In some embodiments of this application, the method further includes: parsing a query request to obtain a corresponding object identifier (for example, a user identifier) in response to the query request; obtaining permission information in a target block in the blockchain network according to the object identifier; performing verification on a matching degree between the permission information and the object identifier; obtaining the identifier of the video, the image feature vector corresponding to the video, and the copyright information of the video from the blockchain network when the permission information matches the object identifier; and transmitting the obtained identifier of the video, the obtained image feature vector corresponding to the video, and the obtained copyright information of the video to a corresponding client, so that the client obtains the corresponding identifier of the video, the corresponding image feature vector corresponding to the video, and the corresponding copyright information of the video that are stored in the blockchain network.

Figure 10:
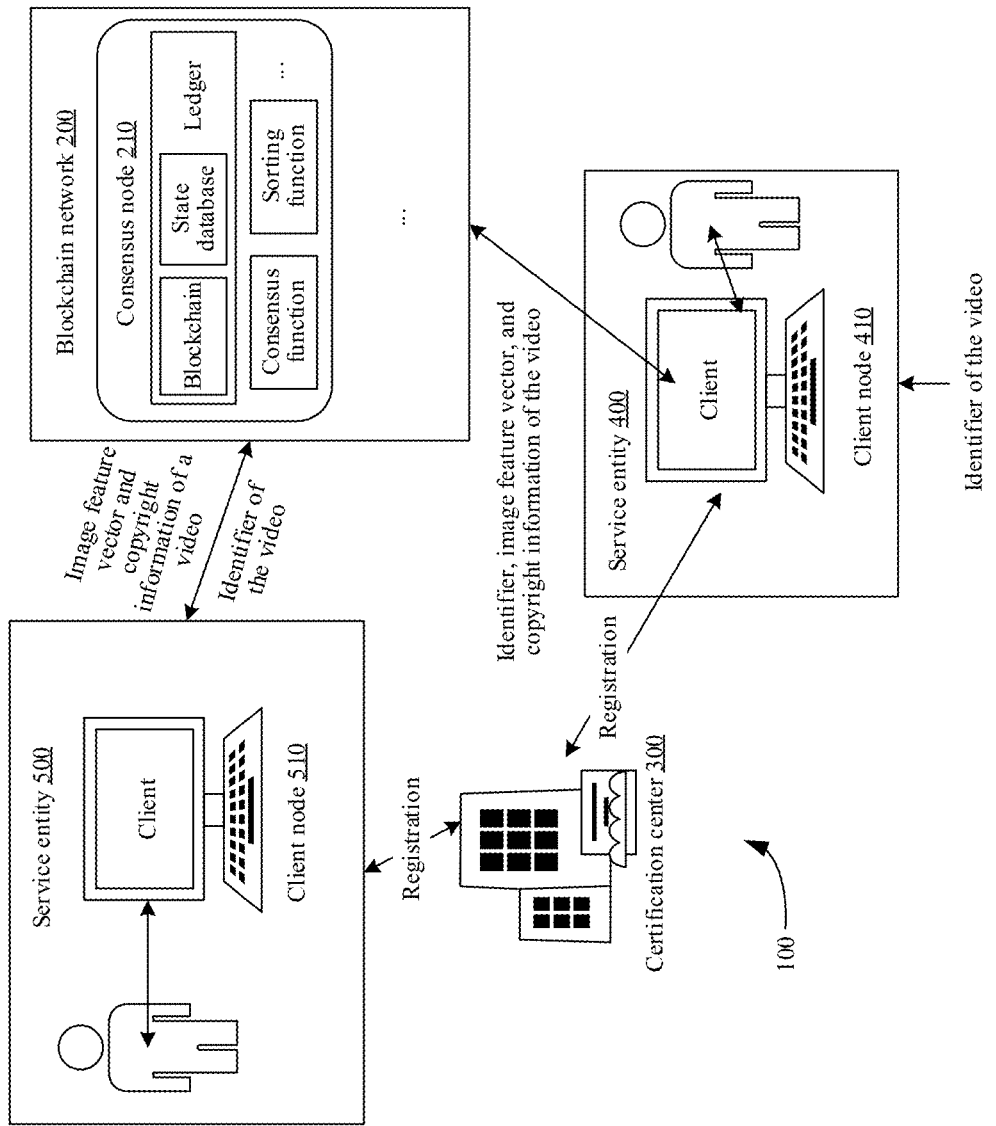
FIG. 10 is a schematic architectural diagram of a video information processing apparatus 100 according to an embodiment of this application.

Continue to refer to FIG. 10. FIG. 10 is a schematic architectural diagram of a video information processing apparatus 100 according to an embodiment of this application. The apparatus 100 includes a blockchain network 200 (including a plurality of consensus nodes, a consensus node 210 being exemplarily shown in FIG. 10), a certification center 300, a service entity 400, and a service entity 500. Descriptions are provided separately below.

A type of the blockchain network 200 is flexible and may be, for example, any one of a public chain, a private chain, or a consortium chain. The public chain is used as an example, electronic devices such as a user terminal and a server of any service entity may access the blockchain network 200 without authorization. The consortium chain is used as an example, an electronic device (for example, a terminal/server) managed by the service entity after obtaining authorization may access the blockchain network 200, and become a client node in the blockchain network 200.

In some embodiments, the client node may serve as only an observer of the blockchain network 200, that is, provide a function of supporting the service entity to initiate transactions (for example, storing data on a chain or querying on-chain data). For functions of the consensus node 210 of the blockchain network 200, for example, a sorting function, a consensus service, and a ledger function, the client node may be implemented by default or selectively (for example, depending on the specific service requirements of the service entity). Therefore, data and service processing logic of the service entity may be migrated into the blockchain network 200 to the great extent, and credibility and traceability of the data and service processing process are implemented through the blockchain network 200.

A consensus node in the blockchain network 200 receives transactions submitted from client nodes (for example, a client node 410 belonging to the service entity 400 shown in the foregoing embodiment and a client node 510 belonging to a database operator system) of different service entities (for example, the service entity 400 and the service entity 500 shown in the foregoing embodiment), executes the transaction to update a ledger or query a ledger, and returns various intermediate results or final results obtained by executing the transaction to the client node of the service entity for display.

For example, the client node 410/510 may subscribe to interested events in the blockchain network 200, for example, transactions that occur in a particular organization/channel in the blockchain network 200. A corresponding transaction notification is pushed by the consensus node 210 to the client node 410/510, thereby triggering the corresponding service logic in the client node 410/510.

The following describes an exemplary application of the blockchain network by using an example in which a plurality of service entities access the blockchain network to manage information related to a video.

Referring to FIG. 10, a plurality of service entities are involved in a management step, for example, the service entity 400 may be a video information processing apparatus, and the service entity 500 may be a display system with a video information processing function. A respective digital certificate is obtained by registering with the certification center 300, and the digital certificate includes a public key of the service entity and a digital signature signed by the certification center 300 on the public key and identity information that are of the service entity. The digital certificate and a digital signature of the service entity for transaction are added to the transaction and sent to the blockchain network, so that the blockchain network obtains the digital certificate and the signature from the transaction and verifies reliability of a message (that is, whether the message is not tempered with) and the identity information of the service entity sending the message. The blockchain network may perform verification based on an identity, for example, whether it has permission to initiate a transaction. A client run by an electronic device (for example, a terminal or a server) managed by the service entity may request to access to the blockchain network 200 as a client node.

The client node 410 of the service entity 400 is configured to transmit an identifier of a video, an image feature vector corresponding to the video, and copyright information of the video to the blockchain network, so that a node in the blockchain network adds the identifier of the video, the image feature vector corresponding to the video, and the copyright information of the video to a new block, and adds the new block to the end of a blockchain when consensus is reached on the new block.

Service logic may be preset in the client node 410, for transmitting the corresponding identifier of the video, the image feature vector corresponding to the video, and the copyright information of the video to the blockchain network 200. For example, using a first video as an example, when it is determined that the first video is not similar to a second video, the client node 410 automatically sends an identifier of the first video, an image feature vector corresponding to the first video, and copyright information of the first video that are to be processed to the blockchain network 200, or a service staff member of the service entity 400 may log in to the client node 410, and manually package and send, to the blockchain network 200, the identifier of the first video, the image feature vector corresponding to the first video, and the copyright information of the first video. Before sending, the client node 410 generates, according to the identifier of the first video, the image feature vector corresponding to the first video, and the copyright information of the first video, a transaction corresponding to an update operation, and specifies a smart contract that needs to be invoked to implement the update operation and a parameter that needs to be transmitted to the smart contract in the transaction, the transaction further carrying a digital certificate and a signed digital signature (for example, the digital signature is obtained by encrypting an abstract of the transaction by using a private key in the digital certificate of the client node 410) that are of the client node 410, and broadcast the transaction to the consensus node 210 in the blockchain network 200.

When receiving the transaction, the consensus node 210 in the blockchain network 200 performs verification on the digital certificate and the digital signature carried in the transaction. After the verification succeeds, whether the service entity 400 has transaction permission is determined according to an identity of the service entity 400 carried in the transaction, and either of the digital signature and permission verification causes the transaction to fail. After the verification succeeds, a digital signature of the consensus node 210 is signed (for example, the digital signature is obtained by encrypting an abstract of the transaction by using a private key of the consensus node 210), and broadcast is performed continuously in the blockchain network 200.

After the consensus node 210 in the blockchain network 200 receives the transaction of which the verification succeeds, the transaction is filled into a new block and broadcast is performed. When broadcasting the new block, the consensus node 210 in the blockchain network 200 performs a consensus process on the new block. If consensus is successfully reached, the new block is added to the end of a blockchain stored locally, a state database is updated according to a result of the transaction, and the transaction in the new block is executed: for a submitted transaction of updating the identifier of the first video, the image feature vector corresponding to the first video, and the copyright information of the first video that are to be processed, adding a key-value pair including the identifier of the first video, the image feature vector corresponding to the first video, and the copyright information of the first video to the state database.

Service personnel of the service entity 500 logs in to a client node 510, and inputs a query request for the identifier of the first video, the image feature vector corresponding to the first video, and the copyright information of the first video. The client node 510 generates, according to the query request, a transaction corresponding to an update operation/query operation, specifies a smart contract that needs to be invoked to implement the update operation/query operation and a parameter that needs to be transmitted to the smart contract in the transaction, the transaction further carrying a digital certificate and a signed digital signature (for example, the digital signature is obtained by encrypting an abstract of the transaction by using a private key in the digital certificate of the client node 510) that are of the client node 510, and broadcasts the transaction to the consensus node 210 in the blockchain network 200.

The consensus node 210 in the blockchain network 200 receives the transaction, and after performing verification on the transaction, filling the block, and reaching consensus, the consensus node 210 adds the filled new block to the end of the blockchain stored locally, updates the state database according to the result of the transaction, and executes the transaction in the new block: for a submitted transaction of updating copyright information of a particular video, updating a key-value pair corresponding to the copyright information of the video in the state database; and for a submitted transaction of querying for copyright information of a particular video, querying the state database for a key-value pair corresponding to the identifier of the first video, the image feature vector corresponding to the first video, and the copyright information of the first video, and returning a result of the transaction.

FIG. 10 exemplarily shows a process of directly uploading an identifier of a video, an image feature vector corresponding to the video, and copyright information of the video to the blockchain. However, in some other embodiments, for a case of a large data amount of identifiers of videos, image feature vectors corresponding to the videos, and copyright information of the videos, the client node 410 may upload hashes of the identifiers of the videos, the image feature vectors corresponding to the videos, and the copyright information of the videos to the blockchain by pairs, and store the identifiers of the videos, the image feature vectors corresponding to the videos, and the copyright information of the videos in a distributed file system or database. After obtaining the identifier of the video, the image feature vector corresponding to the video, and the copyright information of the video from the distributed file system or the database, the client node 510 may perform checking by combining corresponding hashes in the blockchain network 200, thereby reducing the workload of a chaining operation.

Figure 11:
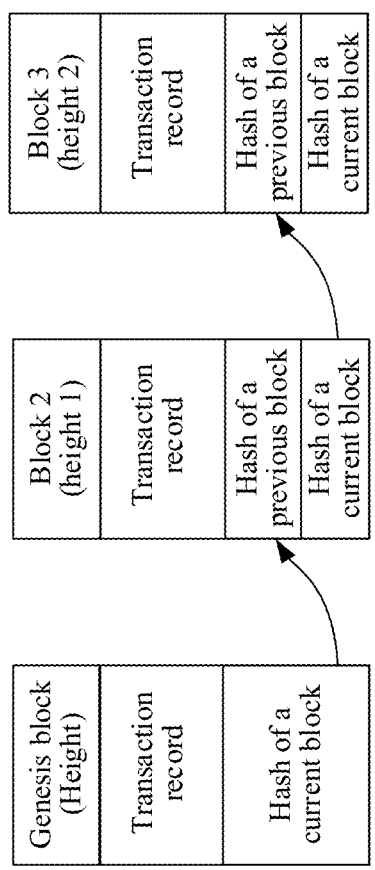
FIG. 11 is a schematic structural diagram of a blockchain in a blockchain network 200 according to an embodiment of this application.

As an example of a blockchain, FIG. 11 is a schematic structural diagram of a blockchain in a blockchain network 200 according to an embodiment of this application. A header of each block may include both hash values of all transactions in the block and hash values of all transactions in a previous block. Newly generated transaction records are filled into blocks and subject to the consensus of nodes in the blockchain network, and are appended to a tail of a blockchain to form a chain growth. The chain structure based on the hash value between the blocks ensures the anti-tampering and anti-counterfeiting of transactions in the blocks.

Figure 12:
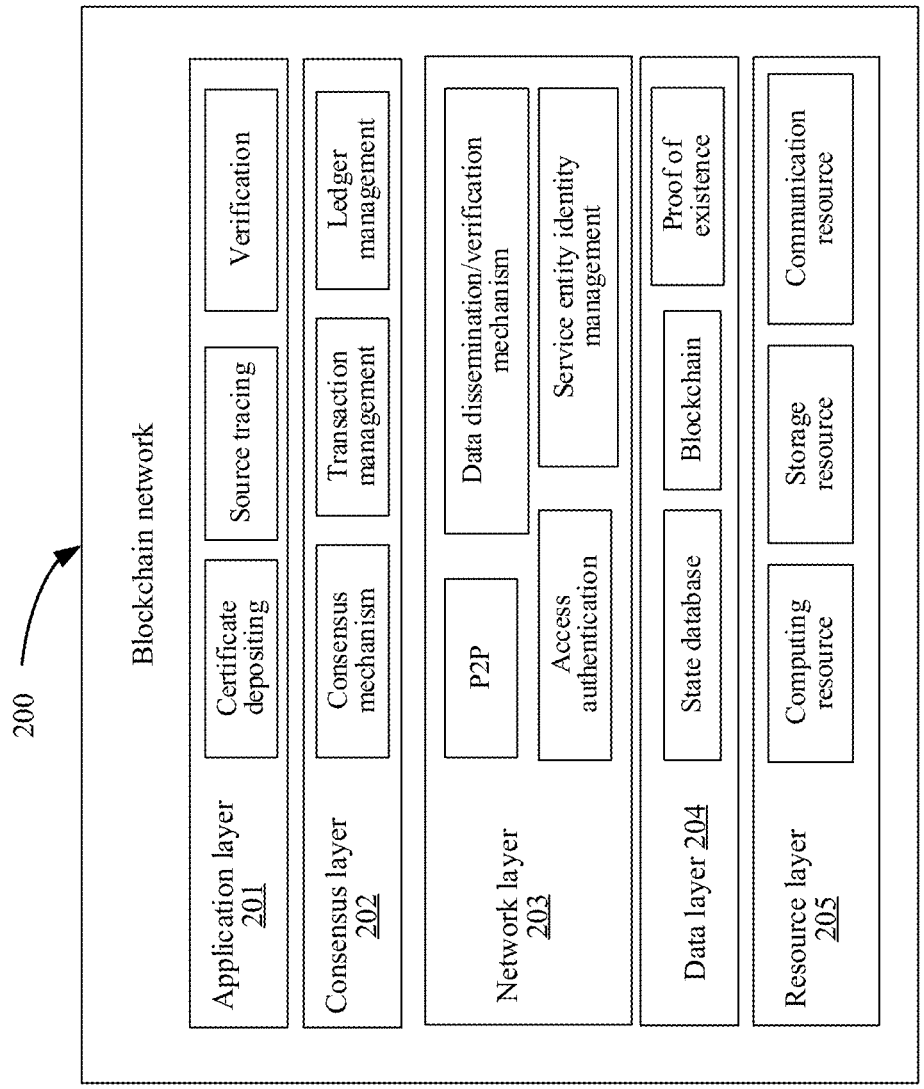
FIG. 12 is a schematic diagram of a functional architecture of the blockchain network 200 according to an embodiment of this application.

The following describes an exemplary functional architecture of a blockchain network provided in the embodiments of this application. FIG. 12 is a schematic architectural diagram of a function of a blockchain network 200 according to an embodiment of this application, including an application layer 201, a consensus layer 202, a network layer 203, a data layer 204, and a resource layer 205. Descriptions are provided separately below.

The resource layer 205 encapsulates a compute resource, a storage resource, and a communication resource for implementing consensus nodes 210 in the blockchain network 200.

The data layer 204 encapsulates various data structures for implementing a ledger, including a blockchain implemented with a file in a file system, a key-value state database, and a proof of existence (for example, a hash tree of a transaction in a block).

The network layer 203 encapsulates functions of a point to point (P2P) network protocol, a data dissemination mechanism and a data validation mechanism, an access authentication mechanism and a service entity identity management.

The P2P network protocol implements communication between the consensus nodes 210 in the blockchain network 200. The data dissemination mechanism ensures dissemination of transactions in the blockchain network 200. The data validation mechanism is used for achieving reliability of data transmission between the consensus nodes 210 based on cryptographic methods (such as digital certificates, digital signatures, or public/private key pairs). The access authentication mechanism is used for performing authentication on the identity of the service entity joining the blockchain network 200 according to actual service scenarios, and grant to the service entity permission to access to the blockchain network 200 when the authentication succeeds. The service entity identity management is used for storing an identity and permission (for example, a type of a transaction that can be initiated) of a service entity allowed to access the blockchain network 200.

The consensus layer 202 encapsulates functions of a mechanism by which the consensus nodes 210 in the blockchain network 200 achieve consistency with blocks (that is, a consensus mechanism), transaction management, and ledger management. The consensus mechanism includes consensus algorithms such as POS, POW, and DPOS, and supports pluggable of the consensus algorithms.

The transaction management is used for performing verification on the digital signature carried in the transaction received by the consensus node 210, performing verification on the identity information of the service entity, and determining, according to the identity information, whether the service entity has permission to execute a transaction (to read related information from the service entity identity management). Each service entity that is authorized to access the blockchain network 200 has a digital certificate issued by the certification center. The service entity uses a private key in its digital certificate to sign a submitted transaction, thereby declaring a legal identity of the service entity.

The ledger management is used for maintaining a blockchain and a state database. A block of which a consensus is reached is appended to a tail of the blockchain, and a transaction in the block of which the consensus is reached is performed. When the transaction includes an update operation, a key-value pair in the state database is updated. When the transaction includes a query operation, the key-value pair in the state database is queried, and a query result is returned to a client node of the service entity. Query operations on the state database in a plurality of dimensions are supported, including: querying for a block according to a block vector number (for example, a hash value of a transaction); querying for a block according to a block hash value; querying for a block according to a transaction vector number; querying for a transaction according to a transaction vector number; querying for account data of the service entity according to an account number (a vector number) of the service entity; and querying for a blockchain on a channel according to a channel name.

The application layer 201 encapsulates various services that can be implemented by the blockchain network, including source tracing, certificate depositing, verification, and the like on the transaction.

In this way, the copyright information of the first video after similarity identification can be stored in the blockchain network. When a new user uploads a video to the video server, the video server may call the copyright information (the first video uploaded by the user may be used as a second video in this case) in the blockchain network to perform verification on copyright compliance of the video.

Figure 13:
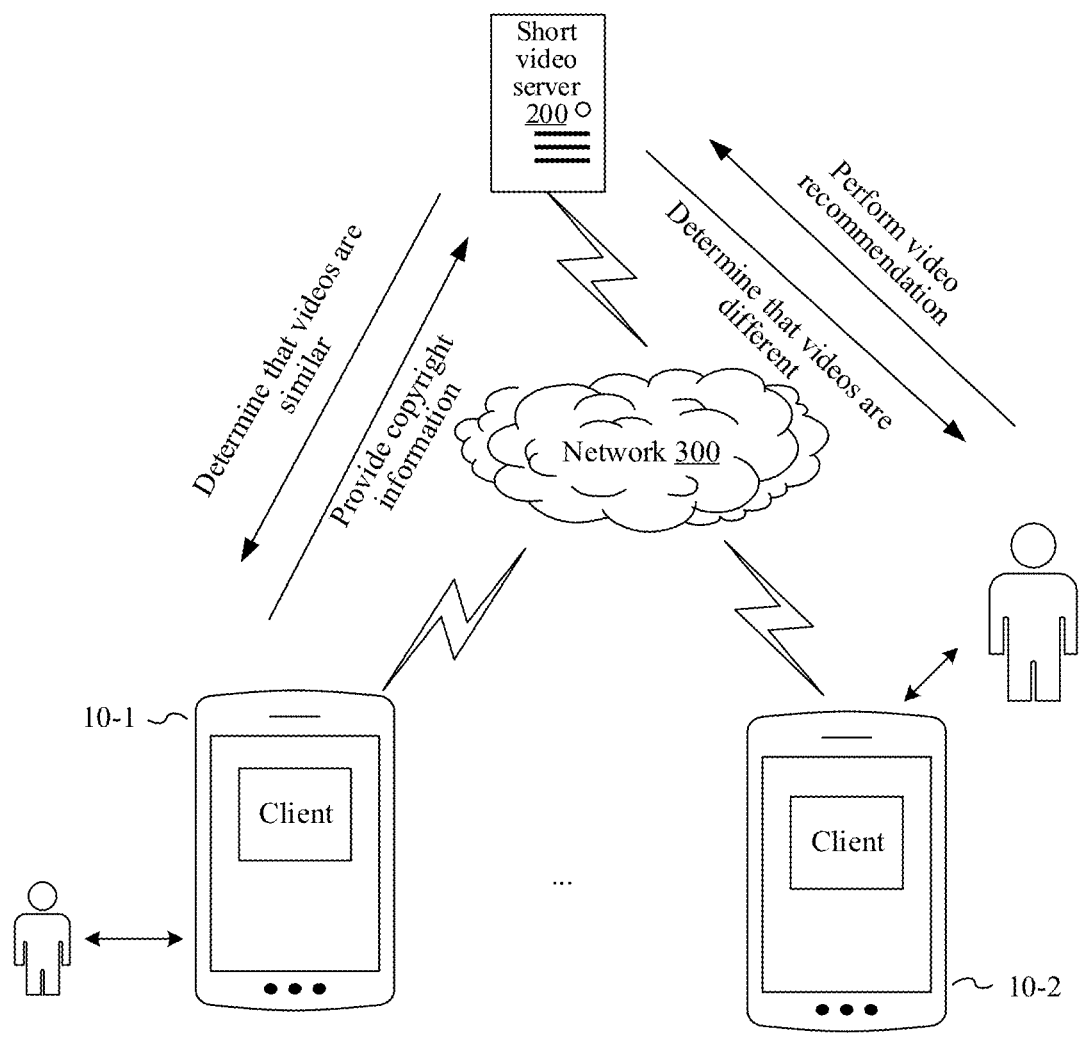
FIG. 13 is a schematic diagram of a usage scenario of a video information processing method according to an embodiment of this application.

FIG. 13 is a schematic diagram of a usage scenario of a video information processing method according to an embodiment of this application. Referring to FIG. 13, terminals (for example, a terminal 10-1 and a terminal 10-2) are each provided with a software client that can display a corresponding short video, for example, a client or plug for playing a short video. A user can obtain and present a video through the corresponding client. The terminal is connected to a short video server 200 through a network 300. The network 300 may be a wide area network or a local area network, or a combination thereof. Certainly, the user may alternatively upload a video through the terminal for viewing by another user in the network. In this process, a video server of an operator needs to detect the video uploaded by the user, compare and analyze different video information, determine whether a copyright of the video uploaded by the user complies with regulations, and recommend a compliant video to different users, to avoid pirated playing of the short video of the user.

In this process, the solution provided in the related technology has at least the following problems:
  a. If dynamic stitching regions of two videos are similar and static stitching regions thereof are not similar, such videos need to be determined as similar videos in an information flow scenario. Due to interference of the static stitching regions of the videos, in the related technology, no special identification is performed on such videos, and this video pair may be determined not to be similar. If a large number of such duplicate videos appear in an information flow, it leads to poor user experience and complaints from users. In addition, in order to avoid copyright problems, many re-uploaders make different patches on static stitching regions in videos to avoid similarity identification. If similar identification is performed according to the solution provided in the related technology, it leads to copyright damage to copyright holders, resulting in serious negative impact.
  b. If dynamic stitching regions of two videos are not similar and static stitching regions are similar, such videos need to be determined as videos that are not similar in an information flow scenario. Due to interference of the static stitching regions of the videos, in the related technology, such videos may be determined to be similar. After a special effect video of the same type (with a same static stitching region) posted by a video uploader in an information flow service is incorrectly identified as a similar video, the video may not be recommended by an information flow. As a result, profits and followers of the uploader are affected, thus causing complaints from the uploader, and consequently causing a negative impact on the service.

Figure 14:
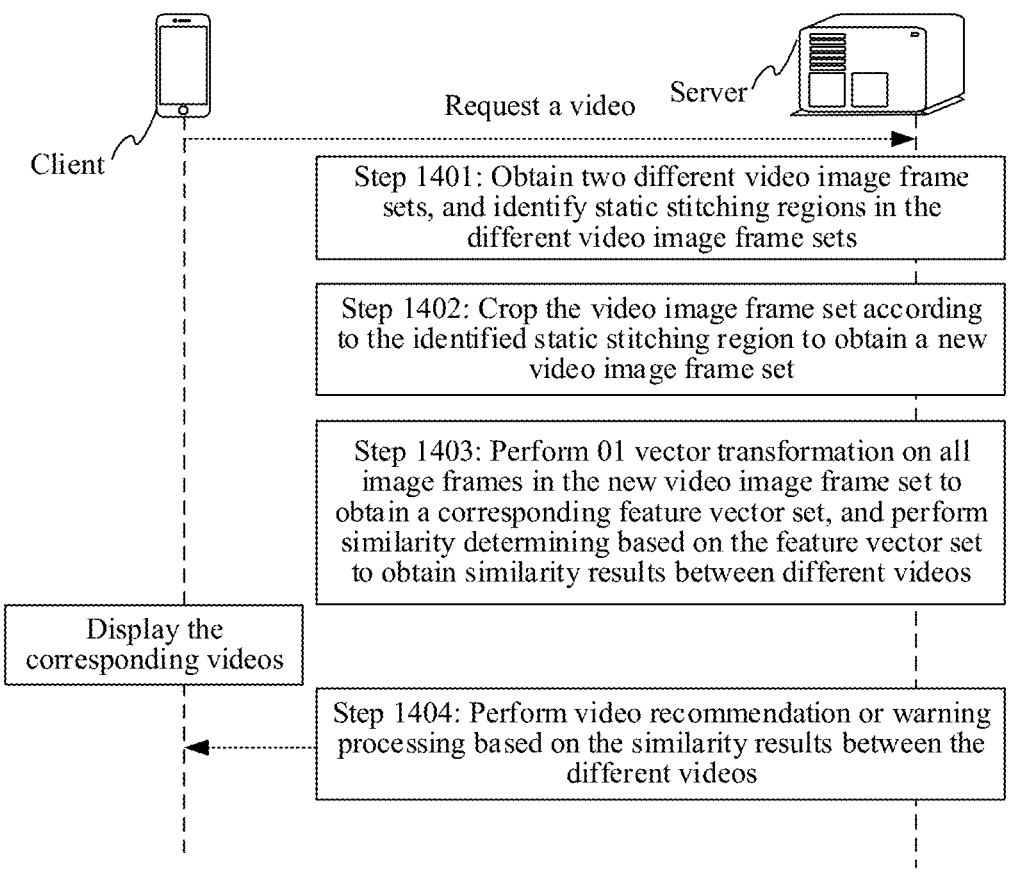
FIG. 14 is a schematic diagram of a usage process of a video information processing method according to an embodiment of this application.

To overcome the foregoing disadvantages, this application provides a video information processing method. The following describes a usage process of the video information processing method provided in this application. Referring to FIG. 14, FIG. 14 is a schematic diagram of a usage process of a video information processing method according to an embodiment of this application. The method specifically includes the following steps:
  Step 1401: Obtain two different video image frame sets, and identify static stitching regions in the different video image frame sets.
  Step 1402: Crop the video image frame set according to the identified static stitching region to obtain a new video image frame set.
  Step 1403: Perform 01 vector transformation on all image frames in the new video image frame set to obtain a corresponding feature vector set (that is, a combination of image feature vectors), and perform similarity determining based on the feature vector set to obtain similarity results between different videos.

Step 1404: Perform video recommendation or warning processing based on the similarity results between the different videos.

Figure 15:
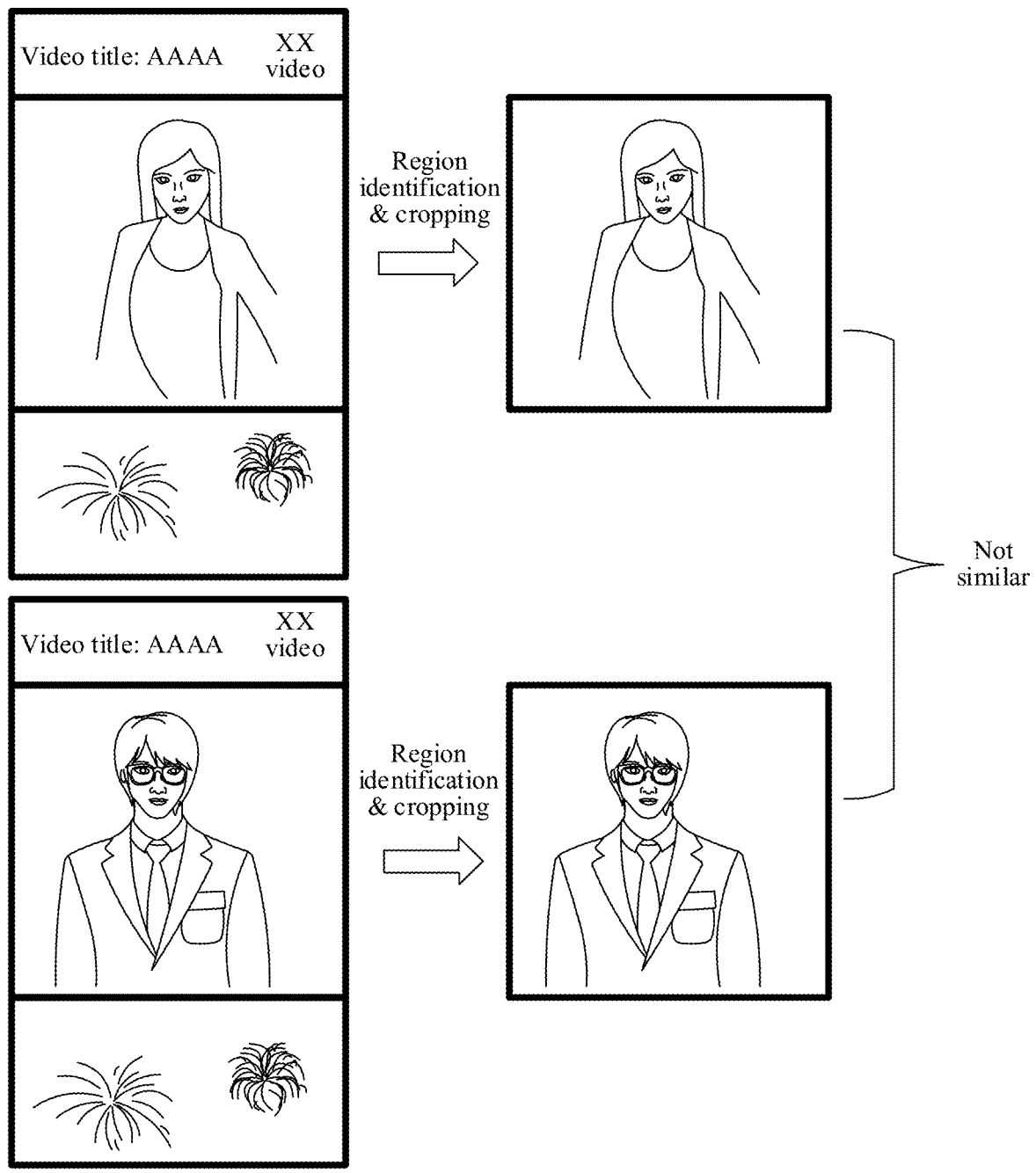
FIG. 15 is a schematic diagram of image cropping of a video information processing method according to an embodiment of this application.
Figure 16:
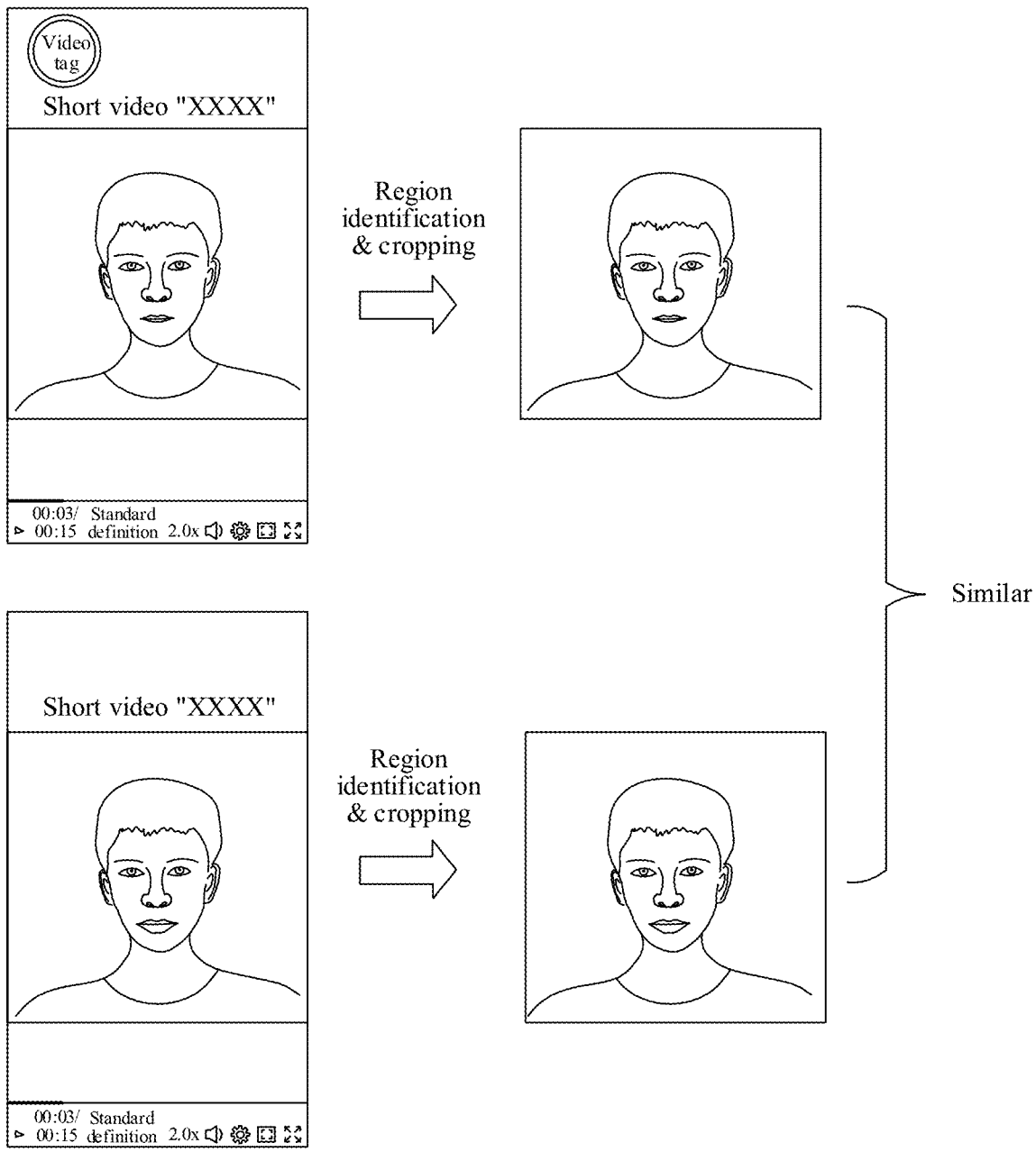
FIG. 16 is a schematic diagram of image cropping of a video information processing method according to an embodiment of this application.

Referring to FIG. 15 and FIG. 16, FIG. 15 is a schematic diagram of image cropping of a video information processing method according to an embodiment of this application perform, and FIG. 16 is a schematic diagram of image cropping of a video information processing method according to an embodiment of this application.

According to the video information processing method provided in this application, when dynamic stitching regions of two videos are similar and static stitching regions thereof are not similar, the two videos can be determined to be similar in an information flow scenario (as shown in FIG. 16). Therefore, one of the videos may have copyright infringement, and a user that uploads the video needs to provide a corresponding copyright certificate for subsequent processing. Further, when dynamic stitching regions of two videos are not similar but static stitching regions thereof are similar, the two videos can be determined to be not similar in an information flow scenario (as shown in FIG. 15), and both can be used as to-be-recommended videos and recommended to different users in the network.

The following further describes an exemplary structure of the video information processing apparatus 2020 provided in the embodiments of this application and implemented as a software module. In some embodiments, as shown in FIG. 2, the software modules stored in the video information processing apparatus 2020 of the memory 202 may include: an information transmission module 2081, configured to determine a video image frame set corresponding to a video; and an information processing module 2082, configured to determine a static stitching region corresponding to an image frame in the video image frame set; crop the image frame in the video image frame set according to the static stitching region, and determine an image feature vector based on a corresponding cropping result; and determine a similarity between a first video and a second video based on an image feature vector corresponding to the first video and an image feature vector corresponding to the second video.

In some embodiments, the information transmission module 2081 is further configured to: parse the video to obtain timing information of the video; parse video parameters corresponding to the video according to the timing information of the video to obtain a play duration parameter and a screen region parameter that correspond to the video; and extract the video based on the play duration parameter and the screen region parameter that correspond to the video to obtain the video image frame set corresponding to the video.

In some embodiments, the information processing module 2082 is further configured to: perform grayscale processing on the image frame in the video image frame set; perform horizontal equal interval sampling and longitudinal equal interval sampling on the image frame on which the grayscale processing has been performed; determine a time dimension variance sum of a horizontal equal interval sampling result of the image frame and a time dimension variance sum of a longitudinal equal interval sampling result of the image frame; determine a longitudinal dimension parameter of the static stitching region of the image frame based on the time dimension variance sum of the horizontal equal interval sampling result of the image frame; and determine a horizontal dimension parameter of the static stitching region of the image frame based on the time dimension variance sum of the longitudinal equal interval sampling result of the image frame.

In some embodiments, the information processing module 2082 is further configured to: construct a new video image frame set according to a plurality of image frames obtained through cropping, an image frame in the new video image frame set including a dynamic stitching region distinct from the static stitching region; and determine an image feature vector corresponding to the image frame in the new video image frame set.

In some embodiments, the information processing module 2082 is further configured to: alternately process different image frames in the new video image frame set by using a convolutional layer and a maximum value pooling layer of a video information processing model to obtain downsampling results of the different image frames; normalize the downsampling results by using a fully connected layer of the video information processing model to obtain a normalization result; and perform deep decomposition on the normalization result by using the video information processing model to obtain image feature vectors matching the different image frames.

In some embodiments, the information processing module 2082 is further configured to: determine a dimension parameter of a dynamic stitching region corresponding to the image frame according to a dimension parameter of the image frame in the video image frame set and a dimension parameter of the static stitching region corresponding to the image frame; the dimension parameter including a longitudinal dimension parameter and a horizontal dimension parameter; and crop the image frame to obtain the dynamic stitching region according to the dimension parameter of the dynamic stitching region as an image frame obtained through cropping.

In some embodiments, the information processing module 2082 is further configured to: obtain a first training sample set, the first training sample set being video processing samples having noise and obtained based on historical data; denoise the first training sample set to obtain a corresponding second training sample set; process the second training sample set by using the video information processing model to determine initial parameters of the video information processing model; process the second training sample set by using the video information processing model in response to the initial parameters of the video information processing model to determine update parameters of the video information processing model; and iteratively update network parameters of the video information processing model according to the update parameters of the video information processing model by using the second training sample set; the updated video information processing model being used for determining an image feature vector.

In some embodiments, the information processing module 2082 is further configured to: perform negative example processing on the second training sample set to obtain a negative sample set corresponding to the second training sample set; and determine a corresponding marginal loss function value according to the negative sample set, the marginal loss function value being used as a supervision parameter for evaluating a processing result of the video information processing model.

In some embodiments, the information processing module 2082 is further configured to: perform at least one of the following processing: randomly combining image feature vectors in the video information processing model to obtain the negative sample set corresponding to the second training sample set; randomly deleting an image feature vector in the video information processing model to obtain the negative sample set corresponding to the second training sample set; or replacing an image feature vector in the video information processing model to obtain the negative sample set corresponding to the second training sample set.

In some embodiments, the information processing module 2082 is further configured to: determine a corresponding inter-frame similarity parameter set according to a similarity between each image frame in a video image frame set corresponding to the first video and each image frame in a video image frame set corresponding to the second video in terms of the image feature vectors; determine, according to the inter-frame similarity parameter set, the number of image frames reaching a similarity threshold; and determine the similarity between the first video and the second video based on the number of image frames reaching the similarity threshold.

In some embodiments, the information processing module 2082 is further configured to: determine the similarity between the first video and the second video based on the number of image frames reaching the similarity threshold, the number of image frames in the video image frame set corresponding to the first video, and the number of image frames in the video image frame set corresponding to the second video.

In some embodiments, the information processing module 2082 is further configured to: obtain copyright information of the first video and copyright information of the second video when it is determined, according to the similarity, that the first video is similar to the second video; determine legality of the first video based on the copyright information of the first video and the copyright information of the second video; and issue warning information when the copyright information of the first video is inconsistent with the copyright information of the second video.

In some embodiments, the information processing module 2082 is further configured to: add the first video to a video source when it is determined, according to the similarity, that the first video is not similar to the second video; sort recall ranks of all to-be-recommended videos in the video source; and recommend a video to a target user based on a sorting result of the recall ranks of the to-be-recommended videos.

In some embodiments, the information processing module 2082 is further configured to: transmit an identifier of the video, an image feature vector corresponding to the video, and copyright information of the video to a blockchain network, so that a node of the blockchain network adds the identifier of the video, the image feature vector corresponding to the video, and the copyright information of the video to a new block, and adds the new block to the end of a blockchain when consensus is reached on the new block.

In some embodiments, the information processing module 2082 is further configured to: receive a data synchronization request of another node in the blockchain network; perform verification on permission of the another node in response to the data synchronization request; and control data synchronization to be performed between a current node and the another node when the permission of the another node is successfully verified, so that the another node obtains the identifier of the video, the image feature vector corresponding to the video, and the copyright information of the video.

In some embodiments, the information processing module 2082 is further configured to: parse a query request to obtain a corresponding object identifier in response to the query request; obtain permission information in a target block in the blockchain network according to the object identifier; perform verification on a matching degree between the permission information and the object identifier; obtain the identifier of the video, the image feature vector corresponding to the video, and the copyright information of the video from the blockchain network when the permission information matches the object identifier; and transmit the obtained identifier of the video, the obtained image feature vector corresponding to the video, and the obtained copyright information of the video to a corresponding client, so that the client obtains the identifier of the video, the image feature vector corresponding to the video, and the copyright information of the video.

The embodiments of this application have at least the following technical effects: In this application, a dynamic stitching region and a static stitching region of a video are distinguished and cropped, and a similarity between videos is determined based on obtained image feature vectors, so that accuracy of determining the similarity between the videos is improved, and inaccurate determining of the similarity between the videos due to blocking and coverage by the static stitching region is reduced.

The foregoing descriptions are merely preferred embodiments of this application, but are not intended to limit this application. Any modification, equivalent replacement and improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video information processing method, performed by an electronic device, the method comprising:
    determining a video image frame set corresponding to each of a first video and a second video, respectively;
    determining a static stitching region corresponding to image frames in the video image frame set;
    cropping the image frames in the video image frame set according to the static stitching region to obtain a cropping result that includes only a dynamic stitching region corresponding to the image frames in the video image frame set;
    constructing a new video image frame set corresponding to each of the first video and the second video according to the cropping result;
    determining an image feature vector for image frames in the new video image frame set by applying a video information processing model constructed based on a Siamese framework and having two identical sub-networks, including alternately processing (i) image frames of the first video in the new video image frame set using a first sub-network of the two identical sub-networks and (ii) image frames of the second video in the new image frame set using a second sub-network of the two identical sub-networks, a respective sub-network including a convolutional layer and a maximum value pooling layer;

determining a similarity between the first video and the second video based on an image feature vector corresponding to a respective image frame of the first video in the new image frame set and an image feature vector corresponding to a respective image frame of the second video in the new image frame set; and outputting a result according to the determined similarity;

wherein the video information processing model is updated by:

obtaining a first training sample set, the first training sample set being video processing samples having noise and obtained based on historical data;

denoising the first training sample set to obtain a corresponding second training sample set;

processing the second training sample set by using the video information processing model to determine initial parameters of the video information processing model;

processing the second training sample set by using the video information processing model in response to the initial parameters of the video information processing model to determine update parameters of the video information processing model;

iteratively updating network parameters of the video information processing model according to the update parameters of the video information processing model by using the second training sample set, to obtain an updated video information processing model; and the updated video information processing model being used for determining an image feature vector for a video.

2. The method according to claim 1, wherein the determining a video image frame set corresponding to each of a first video and a second video, respectively, comprises:

parsing the video to obtain timing information of the video;

parsing video parameters corresponding to the video according to the timing information of the video to obtain a play duration parameter and a screen region parameter that correspond to the video; and extracting the video image frame set from the video based on the play duration parameter and the screen region parameter that correspond to the video to obtain the video image frame set corresponding to the video.

3. The method according to claim 1, wherein the determining a static stitching region corresponding to image frames in the video image frame set comprises:

performing grayscale processing on the image frames in the video image frame set to obtain grayscale image frames;

performing horizontal equal interval sampling and longitudinal equal interval sampling on the grayscale image frames;

determining a time dimension variance sum of a horizontal equal interval sampling result of the grayscale image frames and a time dimension variance sum of a longitudinal equal interval sampling result of the grayscale image frames;

determining a longitudinal dimension parameter of the static stitching region of the image frames based on the time dimension variance sum of the horizontal equal interval sampling result of the grayscale image frames; and determining a horizontal dimension parameter of the static stitching region of the image frames based on the time dimension variance sum of the longitudinal equal interval sampling result of the grayscale image frames.

4. The method according to claim 1, further comprising obtaining downsampling results from the alternately processing, and wherein the determining an image feature vector for image frames in the new video image frame set further comprises:

normalizing the downsampling results of the image frames in the new video image frame set by using a fully connected layer of the video information processing model to obtain a normalization result; and performing deep decomposition on the normalization result by using the video information processing model to obtain image feature vectors matching the different image frames.

5. The method according to claim 1, wherein the cropping the image frame in the video image frame set according to the static stitching region comprises:

determining a dimension parameter of a dynamic stitching region corresponding to the image frame according to a dimension parameter of the image frame in the video image frame set and a dimension parameter of the static stitching region corresponding to the image frame, the dimension parameter comprising a longitudinal dimension parameter and a horizontal dimension parameter; and cropping the image frame to obtain the dynamic stitching region according to the dimension parameter of the dynamic stitching region as an image frame obtained through cropping.

6. The method according to claim 1, wherein the method further comprises:

performing negative example processing on the second training sample set to obtain a negative sample set corresponding to the second training sample set; and determining a corresponding marginal loss function value according to the negative sample set, the marginal loss function value being used as a supervision parameter for evaluating a processing result of the video information processing model.

7. The method according to claim 6, wherein the performing negative example processing on the second training sample set comprises:

performing at least one of:

(i) randomly combining image feature vectors in the video information processing model to obtain the negative sample set corresponding to the second training sample set;

(ii) randomly deleting an image feature vector in the video information processing model to obtain the negative sample set corresponding to the second training sample set; or (iii) replacing an image feature vector in the video information processing model to obtain the negative sample set corresponding to the second training sample set.

8. The method according to claim 1, wherein the determining a similarity between the first video and the second video comprises:

determining a corresponding inter-frame similarity parameter set according to a similarity between each image frame in a video image frame set corresponding to the first video and each image frame in a video image frame set corresponding to the second video in terms of the image feature vectors;

determining, according to the inter-frame similarity parameter set, a number of image frames reaching a similarity threshold; and determining the similarity between the first video and the second video based on the number of image frames reaching the similarity threshold.

9. The method according to claim 8, wherein the determining the similarity between the first video and the second video comprises:
  determining the similarity between the first video and the second video based on the number of image frames reaching the similarity threshold, the number of image frames in the video image frame set corresponding to the first video, and the number of image frames in the video image frame set corresponding to the second video.

10. The method according to claim 1, wherein the method further comprises:
  obtaining copyright information of the first video and copyright information of the second video when it is determined, according to the similarity, that the first video is similar to the second video;
  determining legality of the first video based on the copyright information of the first video and the copyright information of the second video; and
  issuing warning information when the copyright information of the first video is inconsistent with the copyright information of the second video.

11. The method according to claim 1, wherein the method further comprises:
  adding the first video to a video source when it is determined, according to the similarity, that the first video is not similar to the second video;
  sorting recall ranks of all to-be-recommended videos in the video source; and
  recommending a video to a target user based on a sorting result of the recall ranks of the to-be-recommended videos.

12. The method according to claim 1, wherein the method further comprises:
  transmitting an identifier of the video, an image feature vector corresponding to the video, and copyright information of the video to a blockchain network, so that
  a node of the blockchain network adds the identifier of the video, the image feature vector corresponding to the video, and the copyright information of the video to a new block, and adds the new block to the end of a blockchain when consensus is reached on the new block.

13. The method according to claim 12, wherein the method further comprises:
  receiving a data synchronization request of another node in the blockchain network;
  performing verification on permission of the another node in response to the data synchronization request; and
  controlling data synchronization to be performed between a current node and the another node when the permission of the another node is successfully verified, so that the another node obtains the identifier of the video, the image feature vector corresponding to the video, and the copyright information of the video.

14. The method according to claim 12, wherein the method further comprises:
  parsing a query request to obtain a corresponding object identifier in response to the query request;
  obtaining permission information in a target block in the blockchain network according to the object identifier;
  performing verification on a matching degree between the permission information and the object identifier;
  obtaining the identifier of the video, the image feature vector corresponding to the video, and the copyright information of the video from the blockchain network when the permission information matches the object identifier; and
  transmitting the obtained identifier of the video, the obtained image feature vector corresponding to the video, and the obtained copyright information of the video to a corresponding client, so that the client obtains the identifier of the video, the image feature vector corresponding to the video, and the copyright information of the video.

15. An electronic device, comprising:
one or more processors; and
memory, the memory storing instructions that, when executed by the one or processors, cause the one or more processors to perform operations comprising:
  determining a video image frame set corresponding to each of a first video and a second video, respectively;
  determining a static stitching region corresponding to image frames in the video image frame set;
  cropping the image frames in the video image frame set according to the static stitching region to obtain a cropping result that includes only a dynamic stitching region corresponding to the image frames in the video image frame set;
  constructing a new video image frame set corresponding to each of the first video and the second video according to the cropping result;
  determining an image feature vector for image frames in the new video image frame set by applying a video information processing model constructed based on a Siamese framework and having two identical sub-networks, including alternately processing (i) image frames of the first video in the new video image frame set using a first sub-network of the two identical sub-networks and (ii) image frames of the second video in the new image frame set using a second sub-network of the two identical sub-networks, a respective sub-network including a convolutional layer and a maximum value pooling layer;
  determining a similarity between the first video and the second video based on an image feature vector corresponding to a respective image frame of the first video in the new image frame set and an image feature vector corresponding to a respective image frame of the second video in the new image frame set; and
  outputting a result according to the determined similarity;
  wherein the video information processing model is updated by:
    obtaining a first training sample set, the first training sample set being video processing samples having noise and obtained based on historical data;
    denoising the first training sample set to obtain a corresponding second training sample set;
    processing the second training sample set by using the video information processing model to determine initial parameters of the video information processing model;
    processing the second training sample set by using the video information processing model in response to the initial parameters of the video information processing model to determine update parameters of the video information processing model;

iteratively updating network parameters of the video information processing model according to the update parameters of the video information processing model by using the second training sample set, to obtain an updated video information processing model; and the updated video information processing model being used for determining an image feature vector for a video.

16. The electronic device according to claim 15, wherein the determining a video image frame set corresponding to each of a first video and a second video, respectively, comprises:

parsing the video to obtain timing information of the video;

parsing video parameters corresponding to the video according to the timing information of the video to obtain a play duration parameter and a screen region parameter that correspond to the video; and extracting the video image frame set from the video based on the play duration parameter and the screen region parameter that correspond to the video to obtain the video image frame set corresponding to the video.

17. The electronic device according to claim 15, wherein the cropping the image frame in the video image frame set according to the static stitching region comprises:

determining a dimension parameter of a dynamic stitching region corresponding to the image frame according to a dimension parameter of the image frame in the video image frame set and a dimension parameter of the static stitching region corresponding to the image frame, the dimension parameter comprising a longitudinal dimension parameter and a horizontal dimension parameter; and cropping the image frame to obtain the dynamic stitching region according to the dimension parameter of the dynamic stitching region as an image frame obtained through cropping.

18. A non-transitory computer-readable storage medium, storing executable instructions, the executable instructions, when executed by a processor of an electronic device, causing the electronic device to perform operations comprising:

determining a video image frame set corresponding to each of a first video and a second video, respectively;

determining a static stitching region corresponding to image frames in the video image frame set;

cropping the image frames in the video image frame set according to the static stitching region to obtain a cropping result that includes only a dynamic stitching region corresponding to the image frames in the video image frame set;

constructing a new video image frame set corresponding to each of the first video and the second video according to the cropping result;

determining an image feature vector for image frames in the new video image frame set by applying a video information processing model constructed based on a Siamese framework and having two identical sub-networks, including alternately processing (i) image frames of the first video in the new video image frame set using a first sub-network of the two identical sub-networks and (ii) image frames of the second video in the new image frame set using a second sub-network of the two identical sub-networks, a respective sub-network including a convolutional layer and a maximum value pooling layer;

determining a similarity between the first video and the second video based on an image feature vector corresponding to a respective image frame of the first video in the new image frame set and an image feature vector corresponding to a respective image frame of the second video in the new image frame set; and outputting a result according to the determined similarity;

wherein the video information processing model is updated by:

obtaining a first training sample set, the first training sample set being video processing samples having noise and obtained based on historical data;

denoising the first training sample set to obtain a corresponding second training sample set;

processing the second training sample set by using the video information processing model to determine initial parameters of the video information processing model;

processing the second training sample set by using the video information processing model in response to the initial parameters of the video information processing model to determine update parameters of the video information processing model;

iteratively updating network parameters of the video information processing model according to the update parameters of the video information processing model by using the second training sample set, to obtain an updated video information processing model; and the updated video information processing model being used for determining an image feature vector for a video.

* * * * *